United States Patent
Nakatsugawa

(10) Patent No.: US 8,194,584 B2
(45) Date of Patent: Jun. 5, 2012

(54) BASE STATION DEVICE, WIRELESS TERMINAL, WIRELESS COMMUNICATION MANAGEMENT DEVICE, AND WIRELESS COMMUNICATION SYSTEM

(75) Inventor: Keiichi Nakatsugawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 441 days.

(21) Appl. No.: 12/410,656

(22) Filed: Mar. 25, 2009

(65) Prior Publication Data

US 2009/0323663 A1    Dec. 31, 2009

(30) Foreign Application Priority Data

Jun. 30, 2008   (JP) ................ 2008-171764

(51) Int. Cl.
*H04B 7/185* (2006.01)
(52) U.S. Cl. ........ 370/318; 370/329; 370/338; 370/341; 455/411; 455/450; 455/557
(58) Field of Classification Search .............. None
See application file for complete search history.

(56) References Cited

U.S. PATENT DOCUMENTS

| | | | |
|---|---|---|---|
| 5,771,454 A | 6/1998 | Ohsawa | 455/452.2 |
| 5,857,143 A | 1/1999 | Kataoka | 455/62 |
| 6,775,558 B1 * | 8/2004 | Ranta et al. | 455/557 |
| 2006/0009196 A1 * | 1/2006 | Lai et al. | 455/411 |
| 2008/0102839 A1 | 5/2008 | Kurokawa | 455/439 |
| 2009/0196266 A1 * | 8/2009 | Wu et al. | 370/338 |
| 2010/0136989 A1 * | 6/2010 | Westerberg et al. | 455/450 |

FOREIGN PATENT DOCUMENTS

| | | |
|---|---|---|
| JP | 08251655 | 9/1996 |
| JP | 09224283 | 8/1997 |
| JP | 11205848 | 7/1999 |
| JP | 2002204470 | 7/2002 |
| JP | 2008113220 | 5/2008 |

OTHER PUBLICATIONS

Notification of Reason(s) for Refusal dated Mar. 21, 2012 received in Patent Application No. 2008-171764.

* cited by examiner

*Primary Examiner* — Chi H. Pham
*Assistant Examiner* — Shick Hom
(74) *Attorney, Agent, or Firm* — Murphy & King, P.C.

(57) ABSTRACT

A base station device includes: a connection determining unit that determines whether a connection can be allowed in response to a wireless communication connection request from a wireless terminal that can have wireless communications with other base stations; a frequency calculating unit that calculates the frequency at which the connection determining unit prohibits a connection; and a power changing unit that changes transmission power, based on the connection prohibition frequency.

11 Claims, 27 Drawing Sheets

BASE STATION DEVICE, WIRELESS TERMINAL, WIRELESS COMMUNICATION MANAGEMENT DEVICE, AND WIRELESS COMMUNICATION SYSTEM

CROSS-REFERENCE TO RELATED APPLICATION

This application is based upon and claims the benefit of priority of the prior Japanese Patent Application No. 2008-171764, filed on Jun. 30, 2008, the entire contents of which are incorporated herein by reference.

FIELD

The embodiments described herein are related to a base station device, a wireless terminal, a wireless communication management device, and a wireless communication system. An example of such a base station device is a femto base station that forms a femto cell.

BACKGROUND

In recent years, wireless communication systems that cover wide areas such as cellular networks and WiMAX (IEEE 802.16) networks have been developed. There has also been a system in which a femto cell that is a smaller wireless communication area than a wireless communication area of a macro base station is provided as well as a wireless communication area of a base station (a macro base station) of one of the above wireless communication systems. A femto cell system is designed to eliminate a radiowave insensitive area caused when only macro base stations are provided, and to enlarge the wireless communication area. In such a femto cell system, a small-sized femto base station is placed in each subscriber's house or building.

As depicted in FIG. 1, a macro base station 200 is connected to a wireless communication carrier network 212. A wireless terminal (such as a mobile terminal) 204 in the wireless communication area 220 of the macro base station 200 can communicate with the macro base station BS through radio transmission R6. The wireless terminal 204 can communicate with other wireless terminals and application servers via the wireless communication carrier network 212. In the wireless communication system including a femto cell 222, a femto base station 202 is provided as well as the macro base station 200. In FIG. 1, the femto base station 202 is placed in the wireless communication area 220 of the macro base station 200, for example. The femto base station 202 is connected to the wireless communication carrier network 212 via a network such as the Internet 210. The wireless femto base station 202 has smaller transmission power and is less expensive than the macro base station 204. Accordingly, subscribers can easily set up the femto base station 202, and each subscriber occupy the wireless area in their houses. Since the same frequency and the same radio system are used by the macro base station 200 and the femto base station 202, the wireless terminal 204 can also communicate with the femto base station 202 through radio transmission R1.

Japanese Laid-Open Patent Publication No. 9-224283 discloses a technique for performing channel allocation by learning the characteristics of the interference wave of each radio channel between base stations and wireless terminals. Japanese Laid-Open Patent Publication No. 8-251655 discloses a technique for varying the initial value of selected order in accordance with the number of handover failures in a system that performs cellular radio channel allocation in the selected order. Japanese Laid-Open Patent Publication No. 2002-204470 discloses a technique for performing communications via a micro base station when higher-speed communications are required in a system that includes a macro base station and the micro base station that is placed in the cell of the macro base station and has higher communication speed than the macro base station.

Referring now to FIG. 2, the problems with a wireless communication system that includes a femto cell are described. In FIG. 2, a wireless terminal 204 is a terminal of an owner who has obtained and set a femto base station 202 (or a terminal that is registered as a usable terminal), and a wireless terminal 206 is another terminal (or a terminal that is not registered as a usable terminal). By setting the femto base station 202, the owner can obtain a connection with the wireless communication carrier network 212 via the femto base station 202, even when the owner is in a place where the radiowave of a macro base station 200 cannot reach. However, if the radiowave leaks from the subscriber's home, interference with the wireless communication area of the macro base station 200 is caused, and the quality of wireless communications between the macro base station 200 and the other wireless terminal 206 through radio transmission R6 is degraded. For example, in a case where the femto base station 202 is connected only to the wireless terminal 204 of the owner, the wireless terminal 206 sends a connection request to the femto base station 202 through radio transmission R2, but the connection request is denied by the femto base station 202. As a result, the unnecessary operations to make a connection request and refuse a connection are repeated between the femto base station 202 and the wireless terminal 206.

SUMMARY

According to an aspect of the present invention, there is provided a base station device that includes: a connection determining unit that determines whether a connection can be allowed in response to a wireless communication connection request from a wireless terminal that can have wireless communications with other base stations; a frequency calculating unit that calculates the frequency at which the connection determining unit prohibits a connection; and a power changing unit that changes transmission power, based on the connection prohibition frequency.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The following is a description of embodiments of the present invention, with reference to the accompanying drawings.

[First Embodiment]

Figure 1:
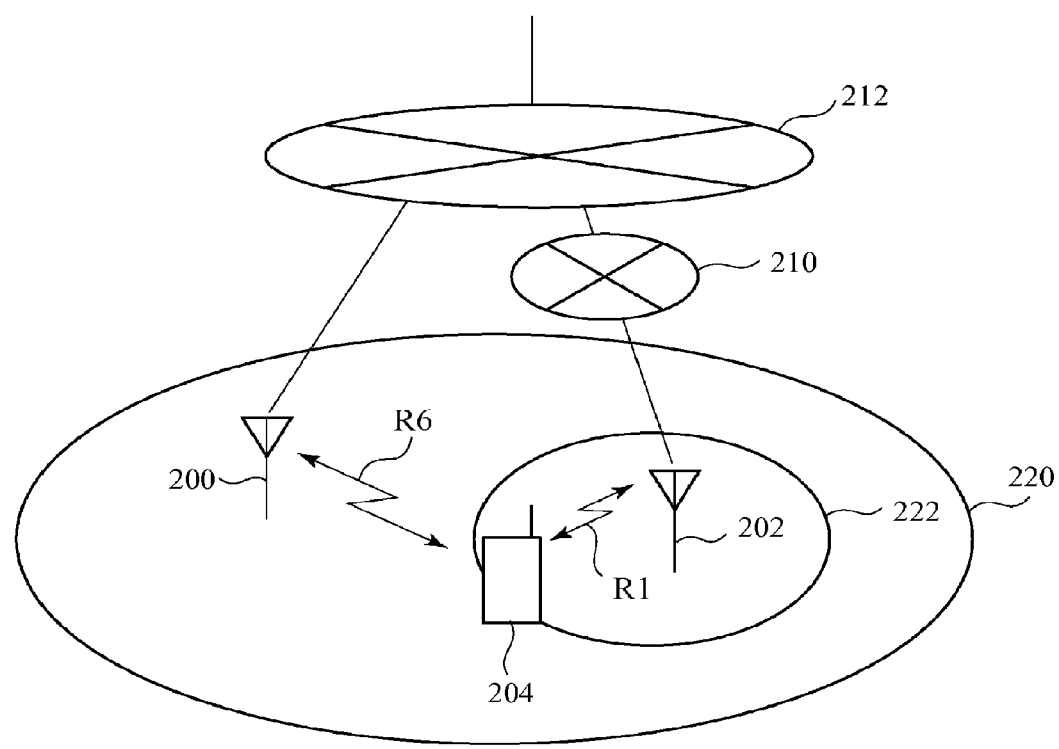
FIG. 1 illustrates the structure of a femto cell.
Figure 2:
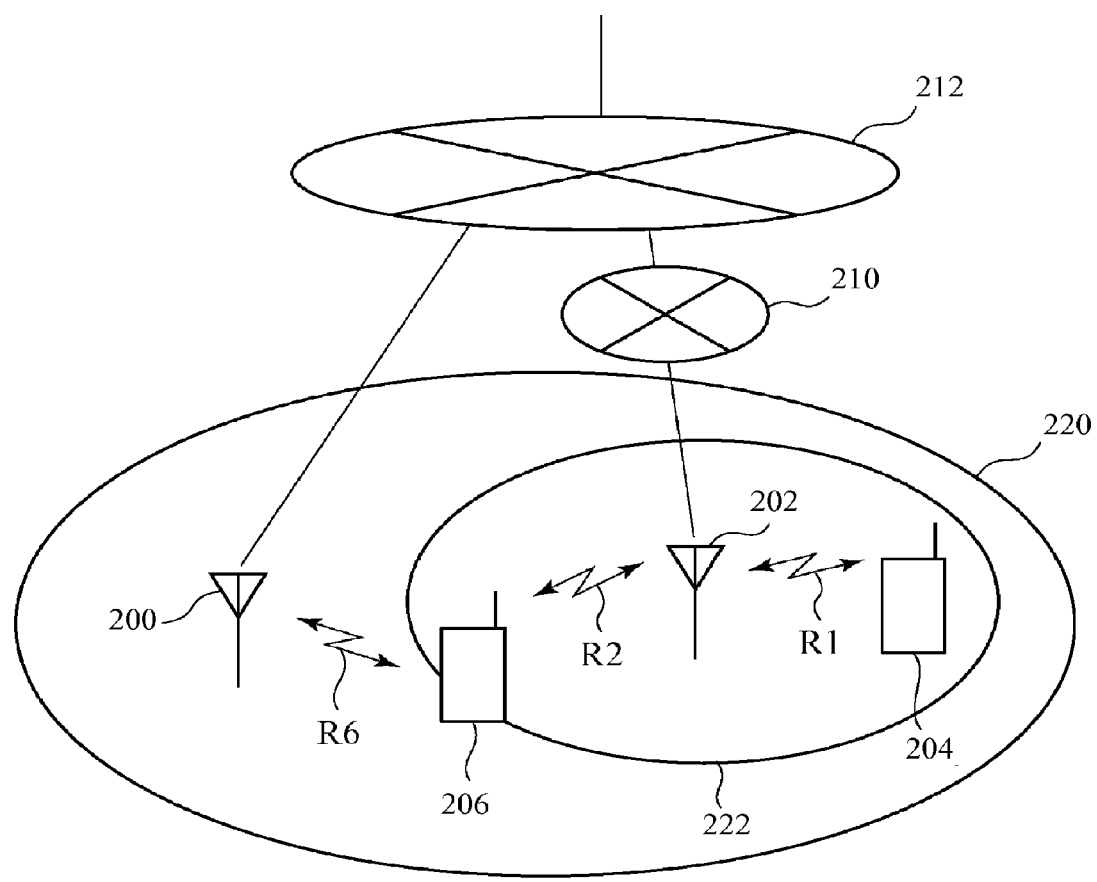
FIG. 2 illustrates the problems with a femto cell.
Figure 3:
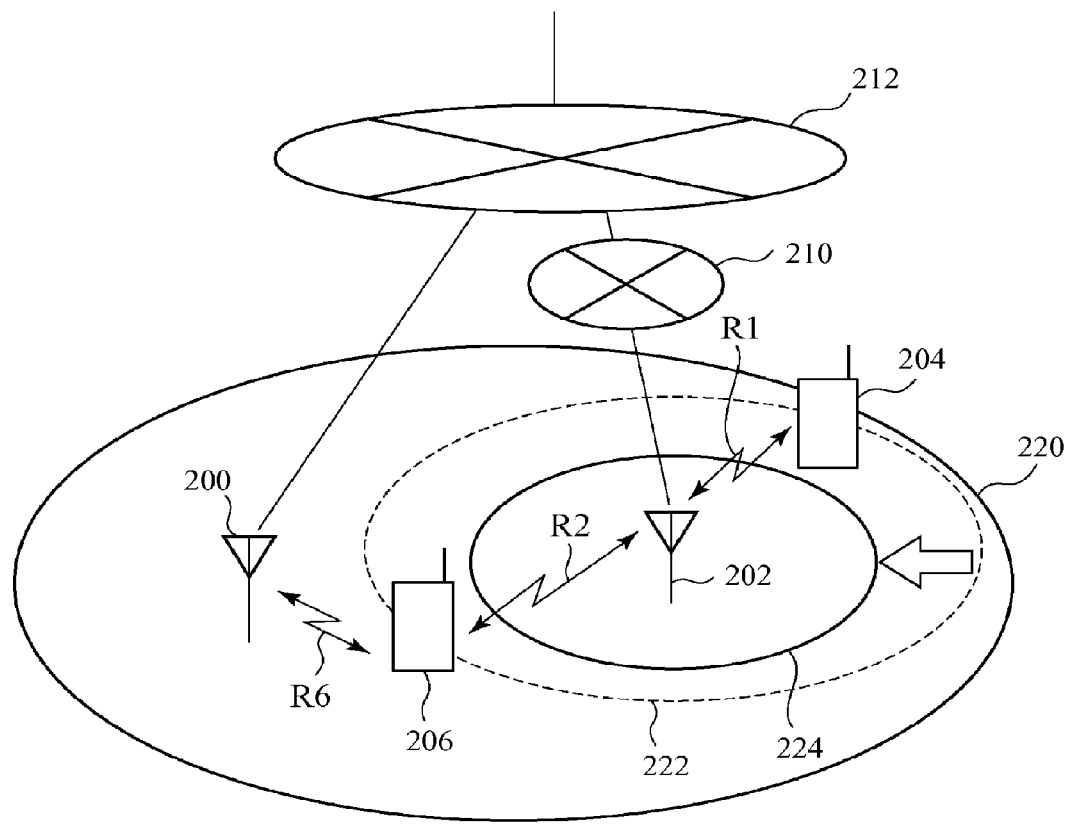
FIG. 3 illustrates the structure of a wireless communication system in accordance with a first embodiment of the present invention.

FIG. 3 schematically illustrates a wireless communication system in accordance with a first embodiment of the present invention. As illustrated in FIG. 3, a femto base station 202 is placed in a wireless communication area of a macro base station 200 (another base station), and has a narrower wireless communication area than the wireless communication area of the macro base station 200. Wireless terminals 204 and 206 can communicate with the macro base station 200 through radio transmission R6. The wireless terminal 204 is registered with the femto base station 202, and can have wireless communications with the femto base station 202. On the other hand, the wireless terminal 206 is not registered with the femto base station 202, and cannot have wireless communications with the femto base station 202. The wireless terminal 206 requests a wireless communication connection with the femto base station 202. However, since the wireless terminal 206 is not registered as a connectable terminal, the femto base station 202 refuses a connection with the wireless terminal 206. The femto base station 202 holds information as to non-connectable terminals, and reduces the transmission power if non-connectable terminals often request connections. In this manner, the range of a femto cell 224 becomes smaller. Thus, the interference of the femto base station 202 with the other wireless terminal 206 becomes smaller.

Figure 4:
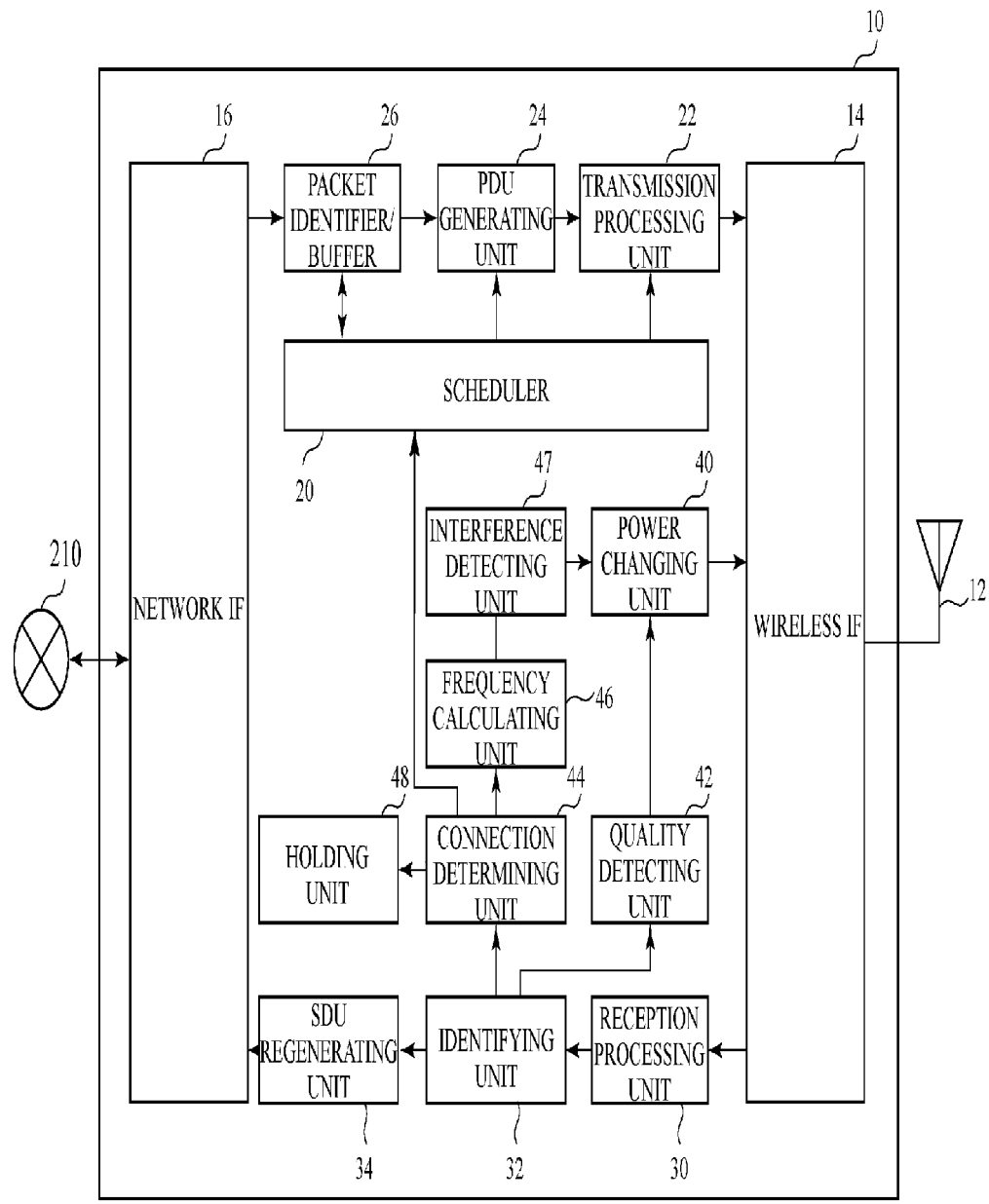
FIG. 4 is a functional block diagram of a base station device in accordance with the first embodiment.

In the following, the first embodiment is described in greater detail. FIG. 4 is a functional block diagram of a base station device 10 provided in the femto base station 202 of the first embodiment. As depicted in FIG. 4, the base station device 10 has an antenna 12. The antenna 12 performs radio transmission and reception with wireless terminals. A wireless interface (IF) 14 for transmission and reception is connected to the antenna 12. In a base station device to be used in a WiMAX network, for example, the wireless interface 14 conforms to IEEE 802.16, and wireless frame transmission is performed through OFDM (Orthogonal Frequency Division Multiplexing) or OFDMA (Orthogonal Frequency Division Multiple Access).

A network interface (IF) 16 receives DL (Down Link) packets (packets for wireless terminals) from a network 210, and also transmits UL (Up Link) packets (packets for wireless communication carrier networks). A packet identifier/buffer 26 identifies packets for each wireless terminal and connection, and temporarily stores identified packets as SDU (Service Data Units) in a buffer. A scheduler 20 checks the packets stored in the buffer, and allots the packets to the slots in a DL sub frame. More specifically, the scheduler 20 allots the SDU to be transmitted to transmission slots. In the case of WiMAX, for example, MAP information is created as the results of the transmission slot allotting. A PDU (Protocol Data Unit) generating unit 24 converts the SDU allotted to the transmission slots into PDU. In this manner, MAC (Media Access Control) headers and CRC (Cyclic Redundancy Check) codes are provided. A transmission processing unit 22 encodes and modulates the PDU, and generates wireless frames. The processed wireless signals are transmitted from the wireless interface 14 to wireless terminals through the antenna 12.

Each UL wireless signal received by the wireless interface 14 is input to a reception processing unit 30. The reception processing unit 30 performs reception frame extraction, demodulation, and decoding on the wireless signal. An identifying unit 32 classifies data into a control message and user data. A SDU regenerating unit 34 converts user data from PDU into SDU. By doing so, defragment and depacking are performed on the PDU, and the MAC header and CRC code are removed from the PDU. The network interface 16 transmits the SDU to the network 210.

A connection determining unit 44 determines whether a connection can be allowed in response to a wireless communication connection request from a wireless terminal 50, based on the control message extracted by the identifying unit 32. A holding unit 48 holds the information as to unallowable connections. A frequency calculating unit 46 calculates the frequency at which the connection determining unit 44 determines that a connection is unallowable. An interference detecting unit 47 determines whether there is interference with wireless terminals. A power changing unit 40 changes the transmission power to be supplied to a wireless terminal from the wireless interface 14. A quality detecting unit 42 detects the quality (the communication quality) of each wireless communication with the wireless terminal 50.

Figure 5:
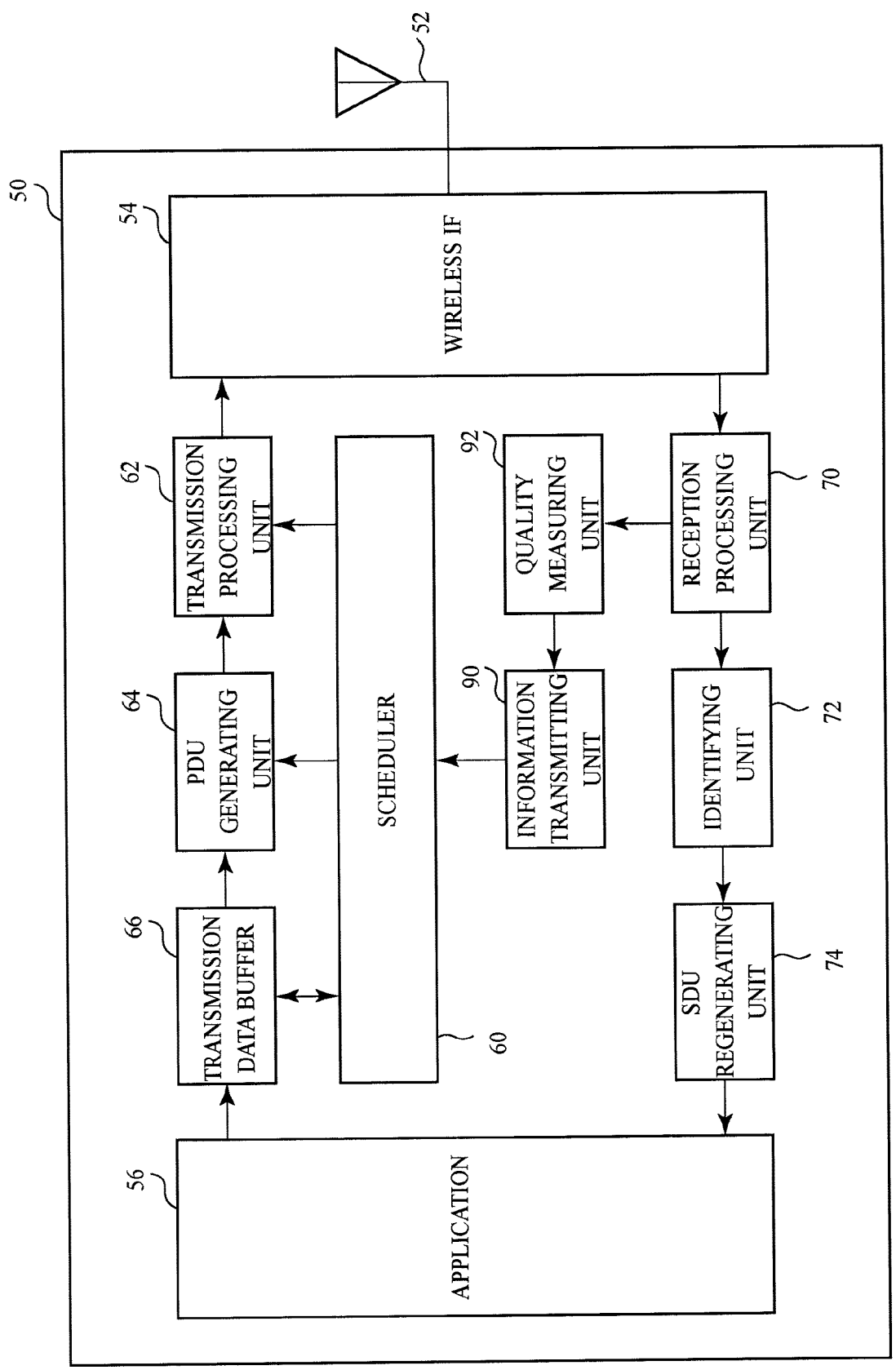
FIG. 5 is a functional block diagram of a wireless terminal in accordance with the first embodiment.

FIG. 5 is a functional block diagram of a wireless terminal 50a and the wireless terminal 50, which are the wireless terminal 204 and the wireless terminal 206. As depicted in FIG. 5, the wireless terminal 50 includes an antenna 52, a wireless interface 54, an application 56, a scheduler 60, a transmission processing unit 62, a PDU generating unit 64, a transmission data buffer 66, a reception processing unit 70, an identifying unit 72, and a SDU regenerating unit 74. The application 56 serves as applications such as a telephone function and a communication function in the wireless terminal 50. The operations to be performed by the respective components to transmit data to and receive data from the application 56 are the same as the operations to be performed by the corresponding components of the base station device 10 of FIG. 4, and therefore, explanation of them is omitted here. A quality measuring unit 92 measures communication quality. An information transmitting unit 90 sends the base station device 10 the information about the communication quality obtained from the quality measuring unit 92.

Figure 6:
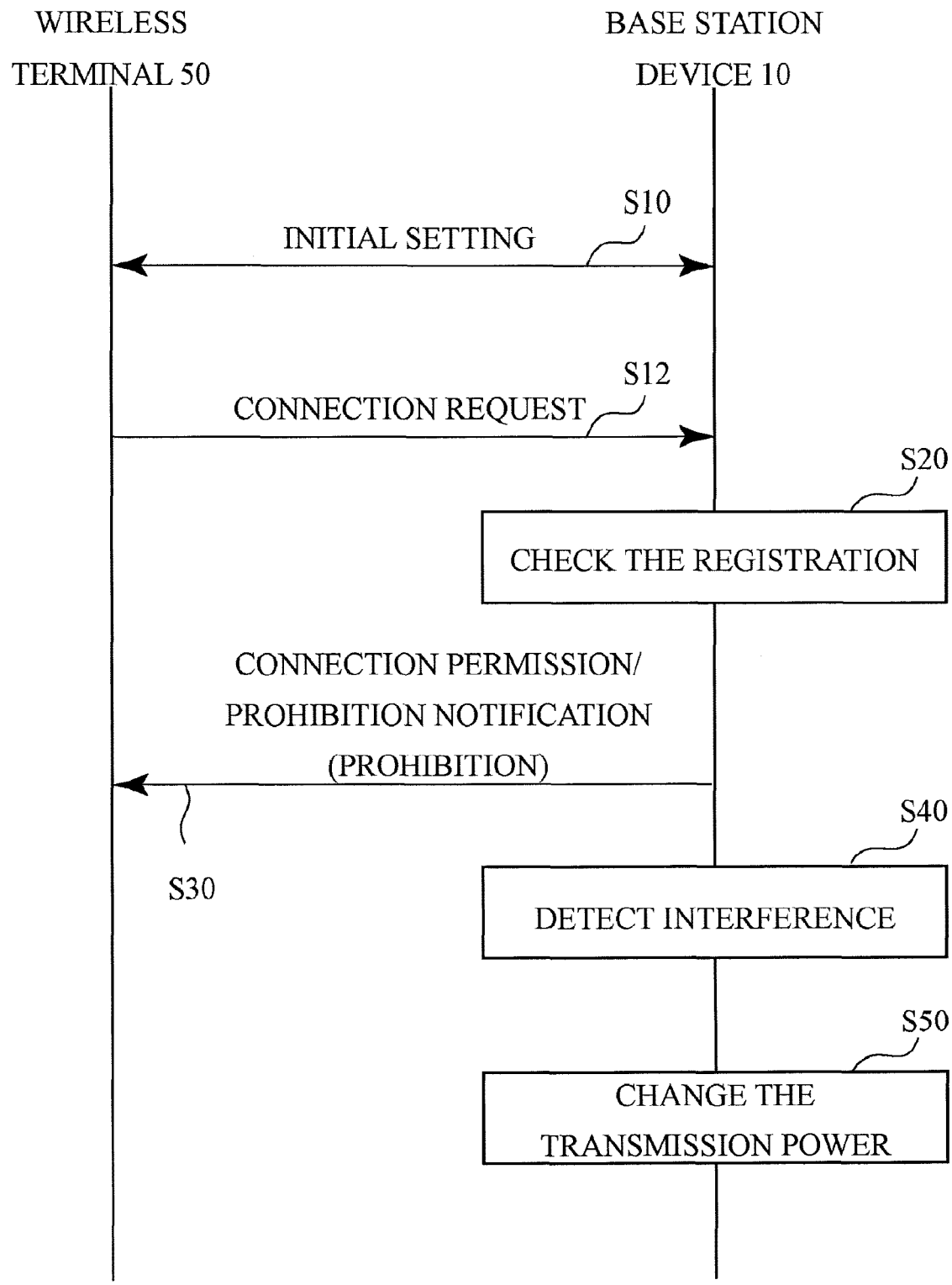
FIG. 6 is a sequence diagram of the wireless communication system in accordance with the first embodiment.

FIG. 6 is a sequence diagram of the wireless communication system in accordance with the first embodiment. The wireless terminal 50 is not registered with the base station device 10. As depicted in FIG. 6, the wireless terminal 50 and the base station device 10 perform initial setting (step S10). In the case of WiMAX, for example, the initial setting is performed in conformity with IEEE 802.16 as follows. First, the base station device 10 sends the wireless terminal 50 information such as the preamble to be broadcast, DL-MAP, and UL-MAP. The wireless terminal 50 transmits an initial ranging code to the base station device 10, using a ranging region in a UL sub frame. The base station device 10 allots a UL slot for receiving a ranging request in step S12. The result is transmitted to the wireless terminal 50 through a CDMA (Code Division Multiple Access) allocator IE in the UL-MAP. The initial setting is thus completed.

The wireless terminal 50 transmits a connection request to the base station device 10 (step S12). For example, the wireless terminal 50 transmits a ranging request message to the base station device 10, using the UL a slot allotted by the CDMA allocator IE. In response to the connection request, the base station device 10 determines whether the wireless terminal 50 is registered (step S20). The base station device 10 transmits unallowable connection information to the wireless terminal (step S30). For example, the base station device 10 transmits a ranging response message to the wireless terminal 50, with a ranging status being set at 2, which represents failed ranging.

The base station device 10 determines whether there is interference (step S40). The base station device 10 determines whether there is interference, based on the frequency at which the base station device 10 determines that a connection is unallowable. The base station device 10 changes the transmission power to be supplied to the wireless terminal 50 (step S50).

Figure 7:
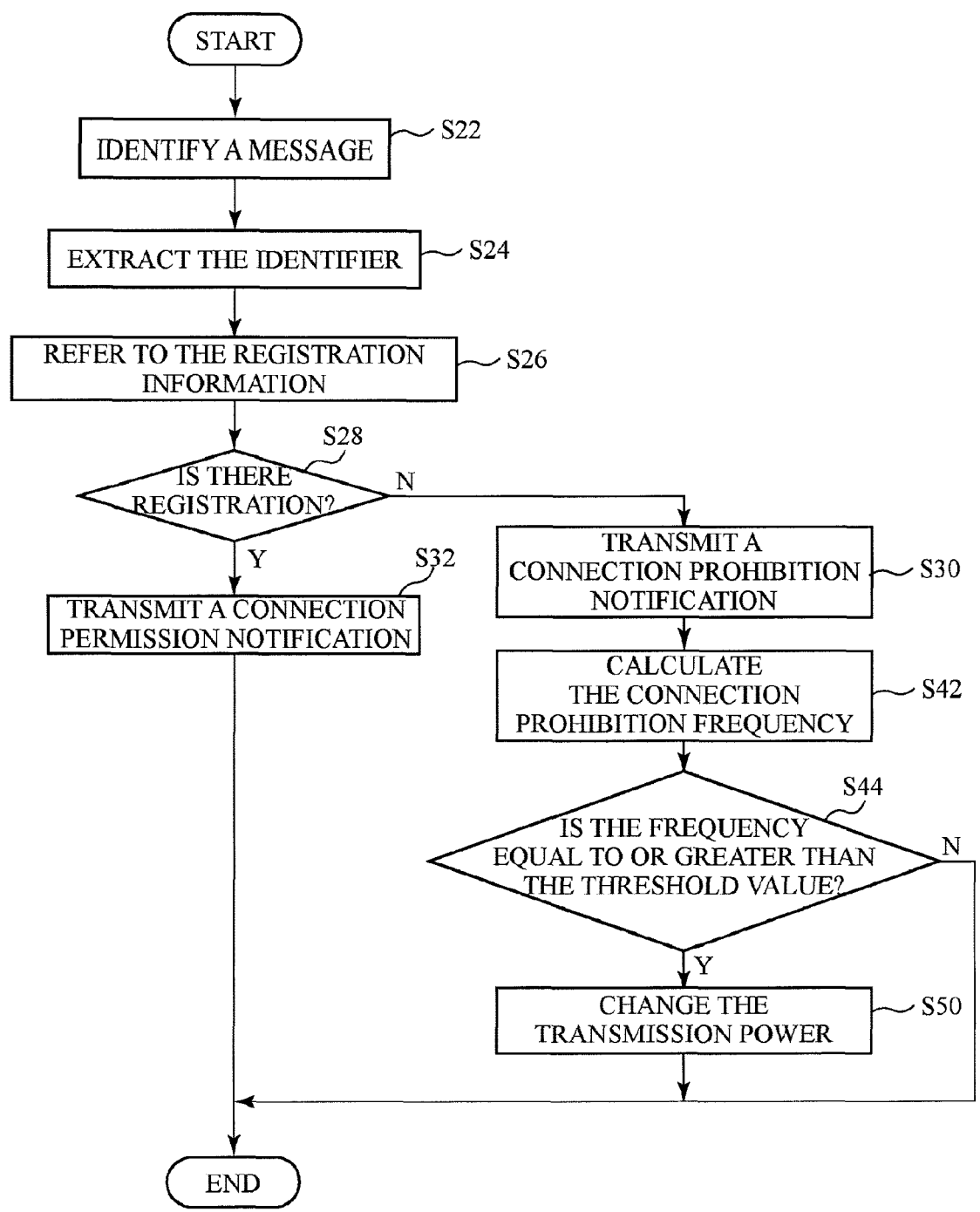
FIG. 7 is a flowchart illustrating an operation to be performed by the base station device in accordance with the first embodiment.

FIG. 7 is a flowchart illustrating the operation to be performed by the base station device 10. As depicted in FIG. 7, in step S20 of FIG. 6, the connection determining unit 44 performs identification in the control message (step S22). The connection determining unit 44 extracts the identifier of the wireless terminal 50 (step S24). For example, the connection determining unit 44 extracts the MAC address of the wireless terminal 50 contained in the ranging request. The connection determining unit 44 then refers to the registration information as to the wireless terminals stored in the holding unit 48 (step S26). The connection determining unit 44 determines whether the wireless terminal 50 is a registered terminal (step S28). In other words, the connection determining unit 44 determines whether the registration information about the wireless terminal 50 is registered in the holding unit 48.

In a case where the result of the determination in step S28 is "Yes", the connection determining unit 44 transmits a connection permission notification to the wireless terminal 50 (step S32). After that, the operation comes to an end. In a case where the result of the determination in step S28 is "No", the connection determining unit 44 transmits a connection prohibition notification to the wireless terminal 50 (step S30).

In step S40 of FIG. 6, the frequency calculating unit 46 counts the number of times the connection determining unit 44 transmits a connection prohibition notification, and calculates the connection prohibition frequency (step S42). For example, the frequency calculating unit 46 can set the number of connection prohibition notifications in a certain period of time (such as one hour, one day, or one week) as the frequency of connection prohibition. In other words, the number of connection prohibition notifications transmitted in a predetermined period of time can be set as the connection prohibition frequency. The interference detecting unit 47 determines whether the connection prohibition frequency is equal to or greater than a predetermined threshold value (step S44). In a case where the determination result is "No", the interference detecting unit 47 ends the operation, without performing interference detection caused by transmission from the base station device 10. In a case where the determination result is "Yes", the interference detecting unit 47 detects interference caused by transmission from the base station device 10. The power changing unit 40 changes the transmission power to be supplied to the wireless terminal 50 (step S50). For example, the power changing unit 40 sets the transmission power at predetermined steps, and, every time the procedure of step S50 is carried out, the power changing unit 40 can reduce the transmission power by one step. Also, taking the connection prohibition frequency into consideration, the power changing unit 40 can make the transmission power smaller if the frequency is higher. In this manner, the power changing unit 40 can reduce the transmission power if the frequency is high.

Figure 8:
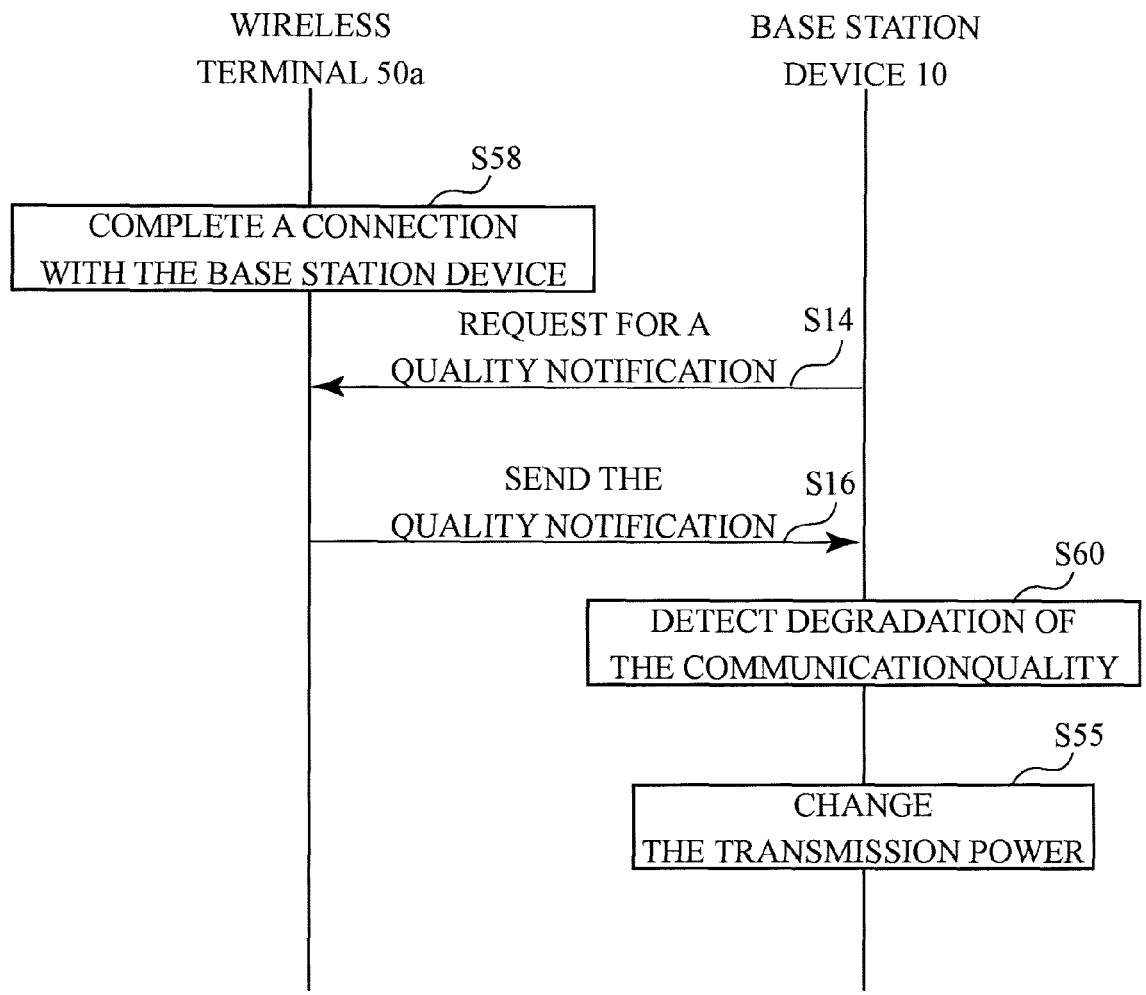
FIG. 8 is a sequence diagram of the wireless communication system in accordance with the first embodiment, continued from the sequence diagram of FIG. 6.

Next, the operation to be performed to change the transmission power based on the quality of a wireless communication state (communication quality) is described. FIG. 8 is a sequence diagram of the wireless communication system in accordance with the first embodiment. As depicted in FIG. 8, the wireless terminal 50a connects to the base station device 10 (step S58). The procedures for connecting the wireless terminal 50a to the base station device 10 is the same as the procedures of steps S10 through S20 of FIG. 6, and the procedures of steps S22 through S28 of FIG. 7. Since the wireless terminal 50a is registered with the base station device 10, the result of the determination in step S28 of FIG. 7 is "Yes", and the base station device 10 transmits a connection permission notification to the wireless terminal 50a (step S32). For example, the ranging status in the ranging response is set at 3, which represents a successful connection.

As depicted in FIG. 8, the base station device 10 arbitrarily or periodically requests the wireless terminal 50a to transmit a communication quality notification (step S14). For example, the base station device 10 transmits a request for a report of wireless channel quality that is the communication quality. Alternatively, in the case of WiMAX, it is possible to set a CQICH that is a feedback channel for periodically transmitting the wireless channel quality from the wireless terminal 50a to the base station device 10. If a CQICH is set up, it is not necessary to make a report request every time. The quality measuring unit 92 of the wireless terminal 50a measures the communication quality. The wireless terminal 50a then notifies the base station device 10 of the communication quality (step S16). For example, the wireless terminal 50a transmits a report response message to the base station device 10. Here, the communication quality may be represented by the received signal strength indication (RSSI), the signal to noise ratio (SNR), SINR (Signal to Interference plus Noise Ratio), or CINR (Carrier to Interference plus Noise Ratio) of the radiowave of the base station device 10 received by the wireless terminal 50a. The base station device 10 then detects degradation of the communication quality (step S60). After detecting degradation of the communication quality, the base station device 10 changes the transmission power to be supplied to the wireless terminal 50a (step S55).

Figure 9:
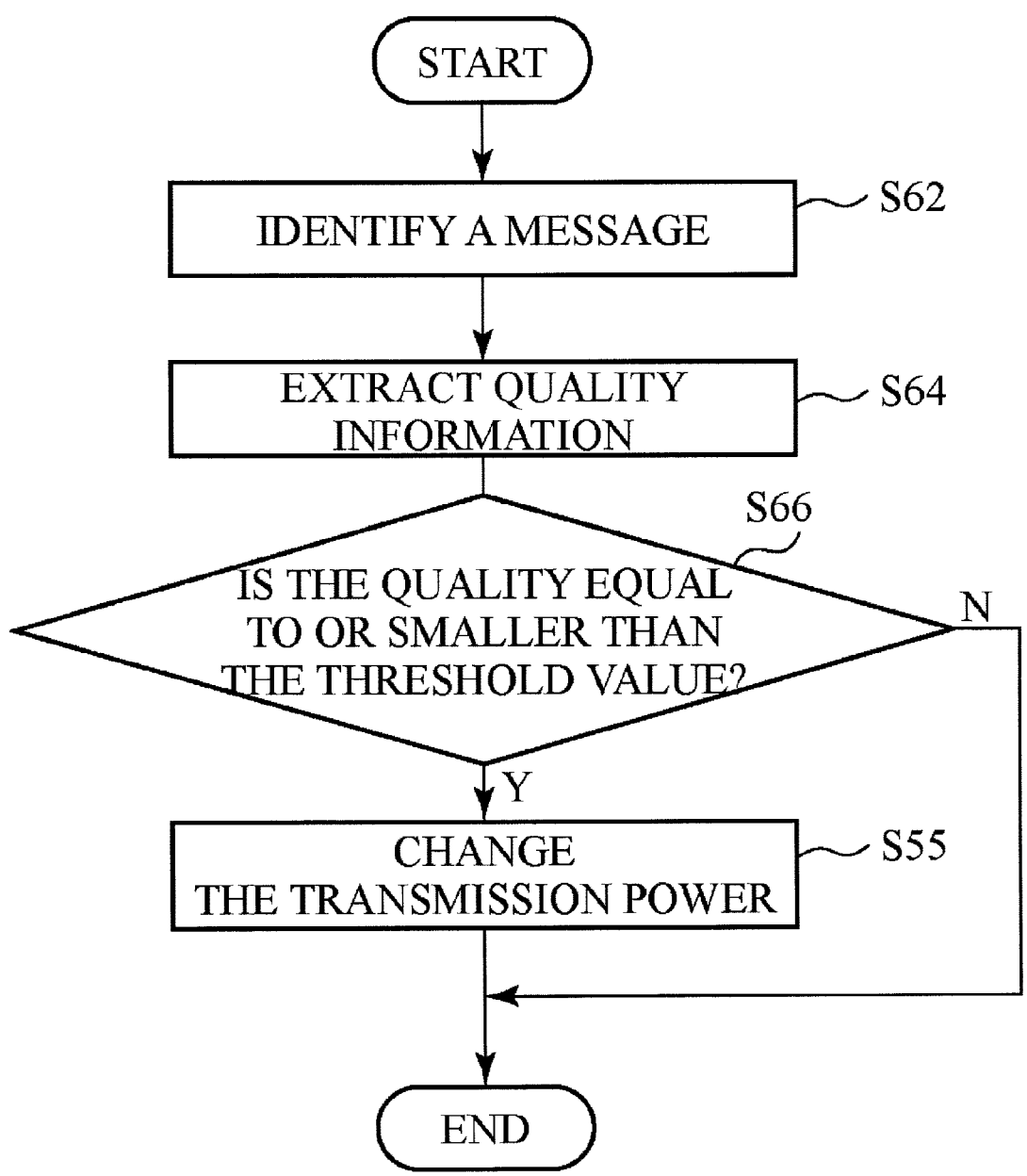
FIG. 9 is a flowchart illustrating the operation to be performed by the base station device in accordance with the first embodiment, continued from the flowchart of FIG. 7.

FIG. 9 is a flowchart illustrating an operation to be performed by the base station device 10. As depicted in FIG. 9, in step S60 of FIG. 8, the identifying unit 32 of the base station device 10 identifies a message (step S62). The identifying unit 32 extracts the information about the communication quality, and outputs the information to the quality detecting unit 42 (step S64). The quality detecting unit 42 determines whether the communication quality is equal to or smaller than a predetermined threshold value (step S66). In a case where the determination result is "No", the operation comes to an end. In a case where the determination result is "Yes", the power changing unit 40 changes the transmission power to be supplied to the wireless terminal 50a (step S55). As in step S50 of FIG. 7, the transmission power is set at predetermined steps, so that the power changing unit 40 can increase the transmission power by one step, every time the procedure of step S55 is carried out. Also, taking degradation of the communication quality into consideration, the power changing unit 40 can perform control so that the transmission power becomes greater if the degradation of the communication quality becomes larger. In this manner, the power changing unit 40 increases the transmission power, if the communication quality is degraded.

In accordance with the first embodiment, the connection determining unit 44 determines whether a connection can be allowed in response to a wireless communication connection request from the wireless terminal 50, as in step S28 of FIG. 7. As in step S42, the frequency calculating unit 46 calculates the frequency at which the connecting determining unit 44 transmits a connection prohibition notification. As in steps S44 and S50, the power changing unit 40 changes the transmission power for wireless communications with the wireless terminal 50, based on the connection prohibition frequency. By changing the transmission power based on the connection prohibition frequency in this manner, the communication area of the base station device 10 can be turned into an area that has less interference with other wireless terminals. In the first embodiment, control is performed so as to reduce the transmission power, if the connection prohibition frequency is high. However, it is also possible to perform control so as to increase the transmission power, if the connection prohibition frequency is low.

Also, as in step S66 of FIG. 9, the quality detecting unit 42 detects the quality of a wireless communication state, and determines whether the quality has been degraded. As in step S55, the power changing unit 40 changes the transmission power, based on the quality of the wireless communication state. By changing the transmission power based on the quality of the wireless communication state in this manner, the communication area of the base station device 10 can be turned into an area with guaranteed communication quality. In the first embodiment, control is performed so as to increase the transmission power, when the communication quality is degraded. However, it is also possible to perform control so as to reduce the transmission power, when the communication quality is improved.

Further, the communication area of the base station device 10 can be turned into an area with an appropriate size by repeatedly performing the control so as to reduce the transmission power when the connection prohibition frequency with the unregistered wireless terminal 50 becomes higher, and the control so as to increase the transmission power when the quality of the communication with the registered wireless terminal 50a is degraded. Since the base station device 10 does not transmit and receive information with a management device and the likes, the communication area of the base station device 10 can be spontaneously turned into an area with an appropriate size.

[Second Embodiment]

Figure 10:
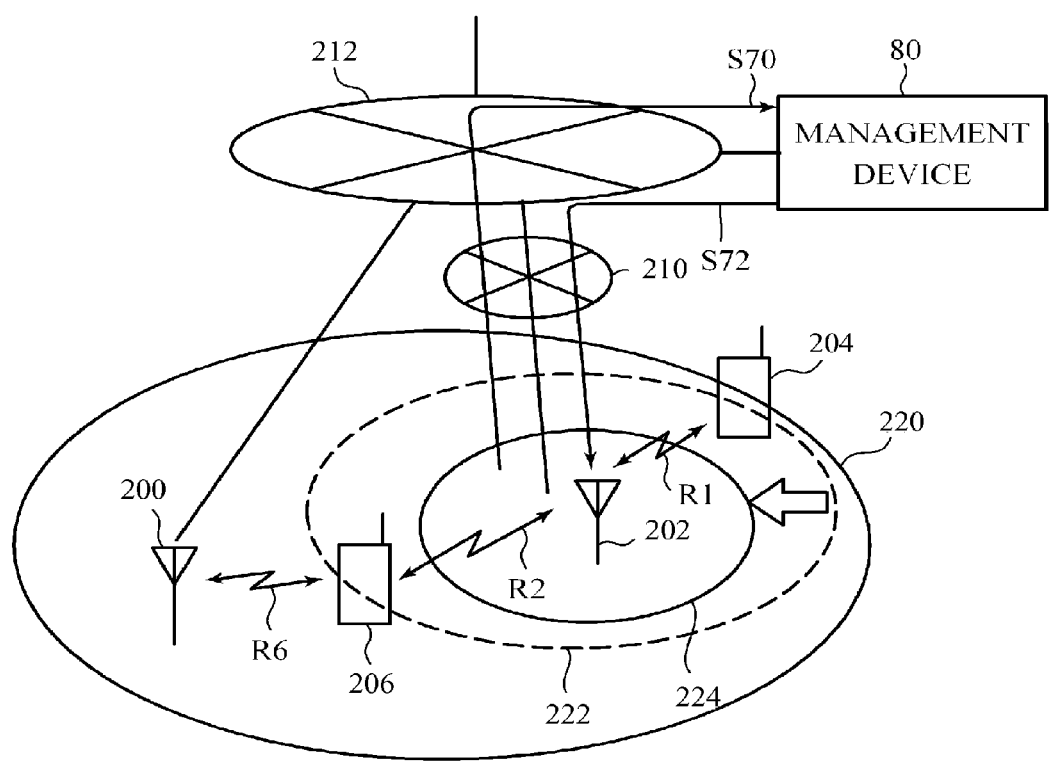
FIG. 10 illustrates the structure of a wireless communication system in accordance with a second embodiment of the present invention.

A second embodiment of the present invention concerns an example case where a wireless communication management device connected to a wireless communication carrier network determines the transmission power of a base station device. FIG. 10 schematically illustrates a wireless communication system in accordance with the second embodiment. As depicted in FIG. 10, if the connection prohibition frequency is high, the femto base station 202 notifies a wireless communication management device 80 that the connection prohibition frequency is high (step S70). The management device 80 determines the transmission power of the base station device 10, and sends an instruction to the base station device 10 (step S72). In accordance with the instruction from the management device 80, the base station device 10 changes the transmission power. In this manner, the range of the femto cell 224 becomes smaller. Accordingly, the interference of the femto base station 202 with the other wireless terminal 206 becomes smaller.

Figure 11:
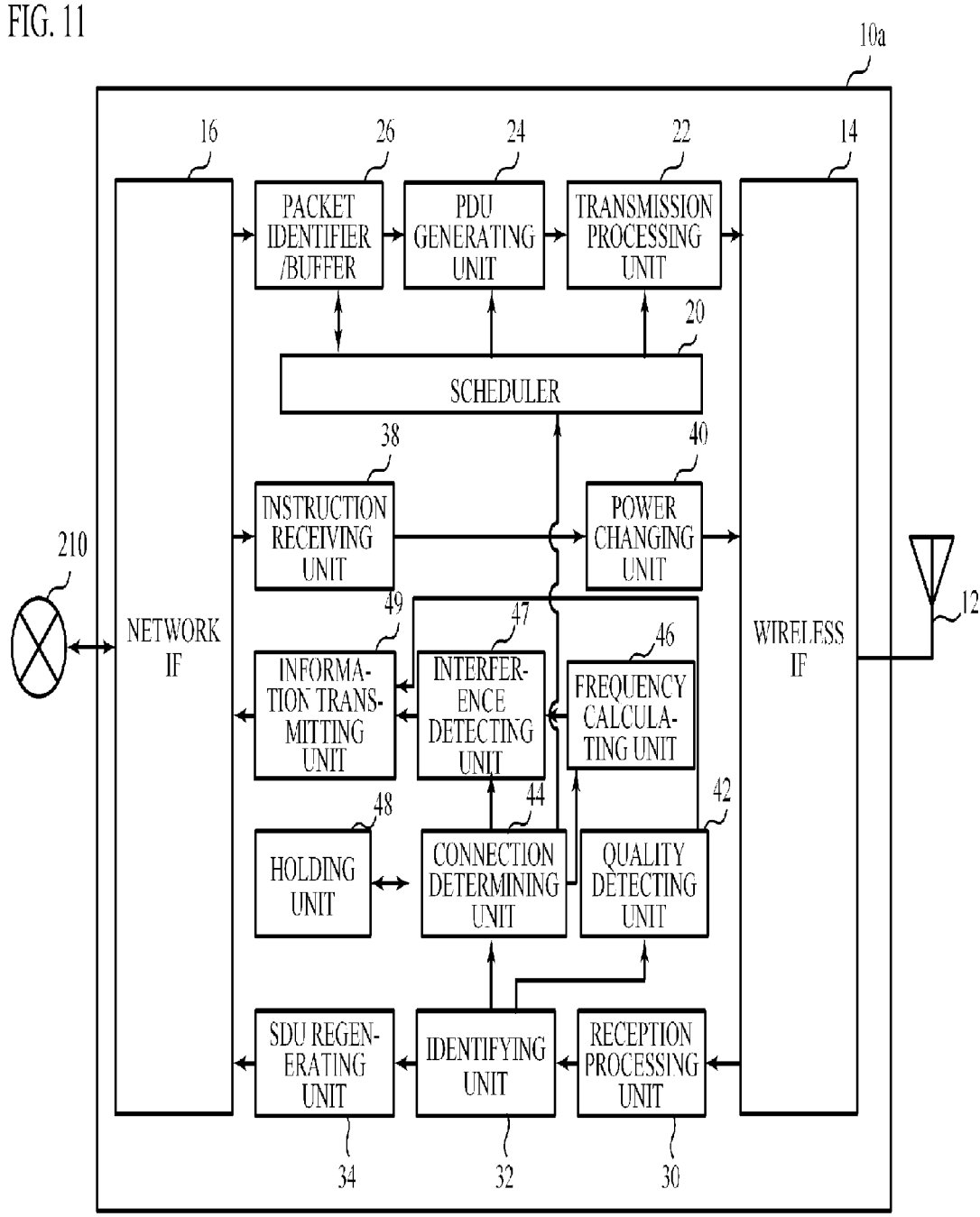
FIG. 11 is a functional block diagram of a base station device in accordance with the second embodiment.

In the following, the second embodiment is described in greater detail. FIG. 11 is a functional block diagram of a base station device 10a of the femto base station 202 of the second embodiment. As depicted in FIG. 11, an information transmitting unit 49 outputs the information indicating interference detected by the interference detecting unit 47 (the information about the connection prohibition frequency) and the information indicating quality degradation detected by the quality detecting unit 42 (the information about the quality of the wireless communication state) to the management device 80 via the network interface 16 and the network 210. An instruction receiving unit 38 receives information about an instruction issued by the management device 80, via the network 210 and the network interface 16. The other aspects of the structure of this embodiment are the same as those of the first embodiment depicted in FIG. 4, and therefore, explanation of them is omitted here.

Figure 12:
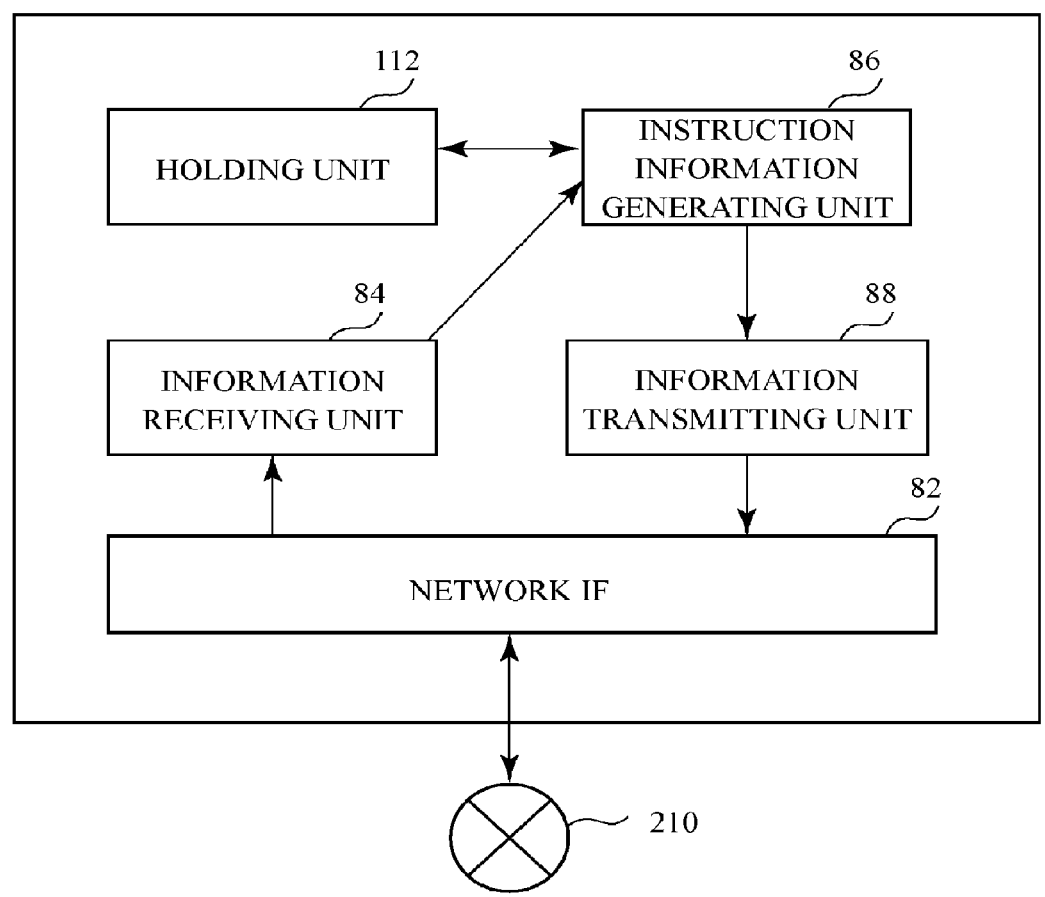
FIG. 12 is a functional block diagram of a management device in accordance with the second embodiment.

FIG. 12 is a functional block diagram of the management device 80 of the second embodiment. A network interface 82 is connected to the network 210 via a wireless communication carrier network 212, and inputs and outputs information to and from the base station device 10a. An information receiving unit 84 receives the information about the connection prohibition frequency from the base station device 10a via the network 210. An instruction information generating unit 86 determines the transmission power based on the information about the connection prohibition frequency and the information stored in a holding unit 112, and generates the information about the instruction to cause the base station device 10*a* to change the transmission power (the instruction information). The holding unit 112 holds the information about the locations of each femto base station and each macro base station, and the likes. An instruction transmitting unit 88 transmits the instruction information about a transmission power change to the base station device 10*a* via the network 210.

Figure 13:
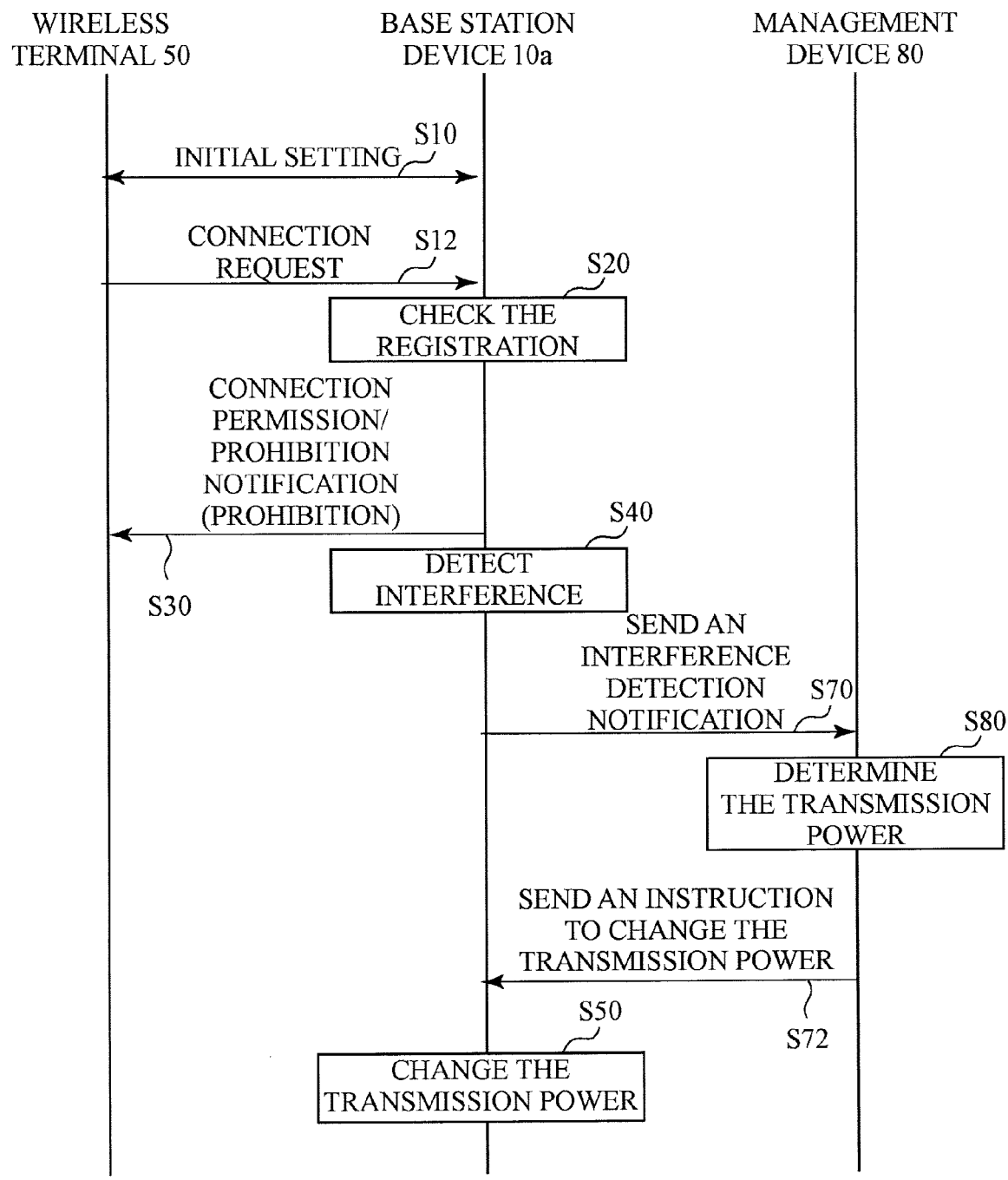
FIG. 13 is a sequence diagram of the wireless communication system in accordance with the second embodiment.

FIG. 13 is a sequence diagram of the wireless communication system in accordance with the second embodiment. Here, the wireless terminal 50 is a wireless terminal not registered with the base station device 10*a*. As depicted in FIG. 13, the procedures of steps S10 through S40 are the same as the corresponding procedures of the first embodiment depicted in FIG. 6, and therefore, explanation of them is omitted here. After detecting interference in step S40, the base station device 10*a* notifies the management device 80 of the detected interference (step S70). As depicted in FIG. 13, based on the detected interference notification (the information about the connection prohibition frequency), the management device 80 determines the transmission power (step S80). The management device 80 then transmits the instruction information to cause the base station device 10*a* to change the transmission power (step S72). Based on the instruction information, the base station device 10*a* changes the transmission power to be output to the wireless terminal 50 (step S50).

Figure 14:
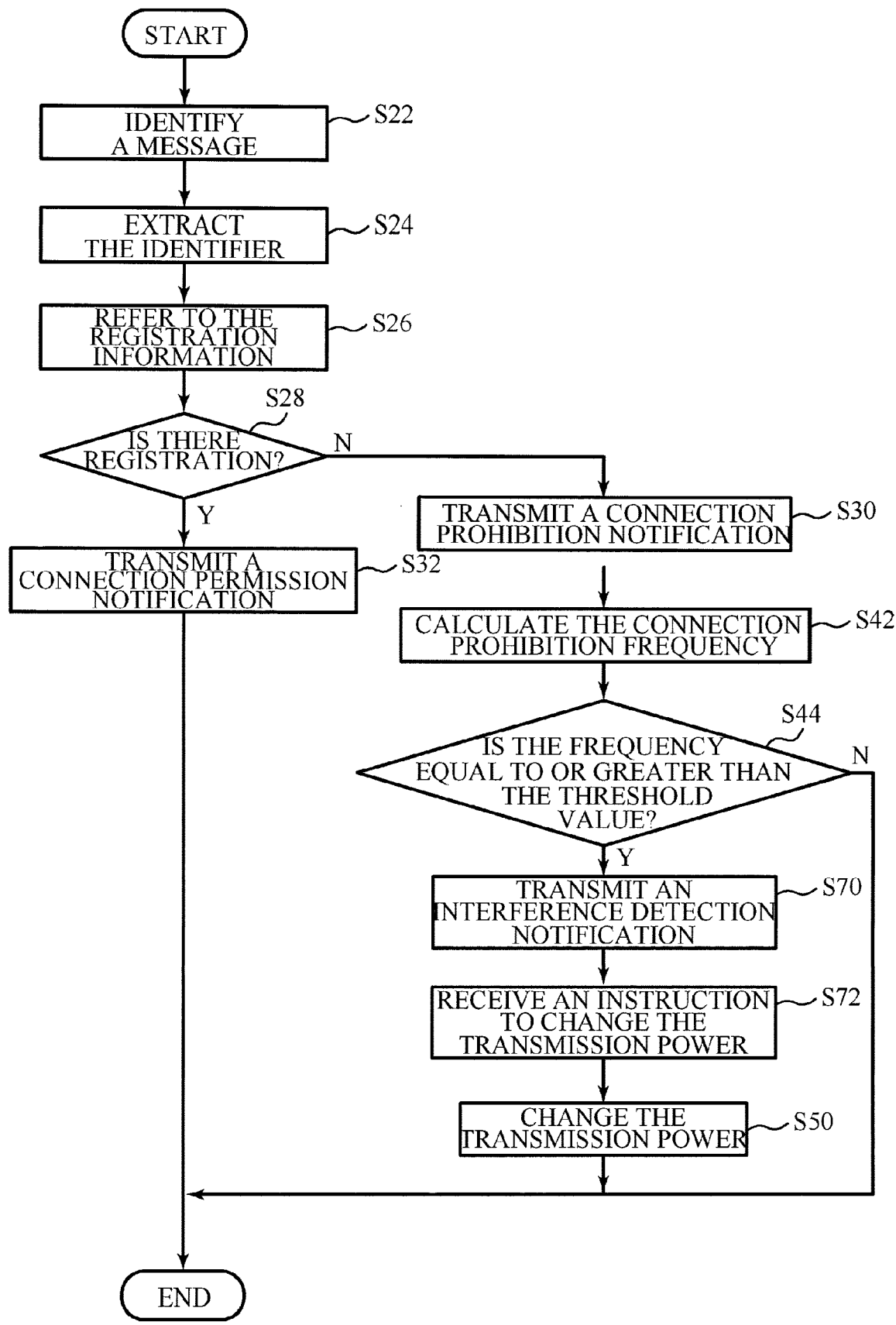
FIG. 14 is a flowchart illustrating an operation to be performed by the base station device in accordance with the second embodiment.

FIG. 14 is a flowchart illustrating an operation to be performed by the base station device 10*a*. As depicted in FIG. 14, the procedures of steps 22 through S44 are the same as the corresponding procedures of the first embodiment depicted in FIG. 7, and therefore, explanation of them is omitted here. In a case where the determination result in step S44 is "Yes", the information transmitting unit 49 sends the management device 80 via the network 210 the information indicating that interference with the other wireless terminal 50 has been detected (step S70). The instruction receiving unit 38 of the base station device 10*a* receives the instruction information from the management device 80 via the network 210 (step S72). Based on the instruction information, the power changing unit 40 changes the transmission power to be output to the wireless terminal 50 (step S50), and the operation comes to an end.

Figure 15:
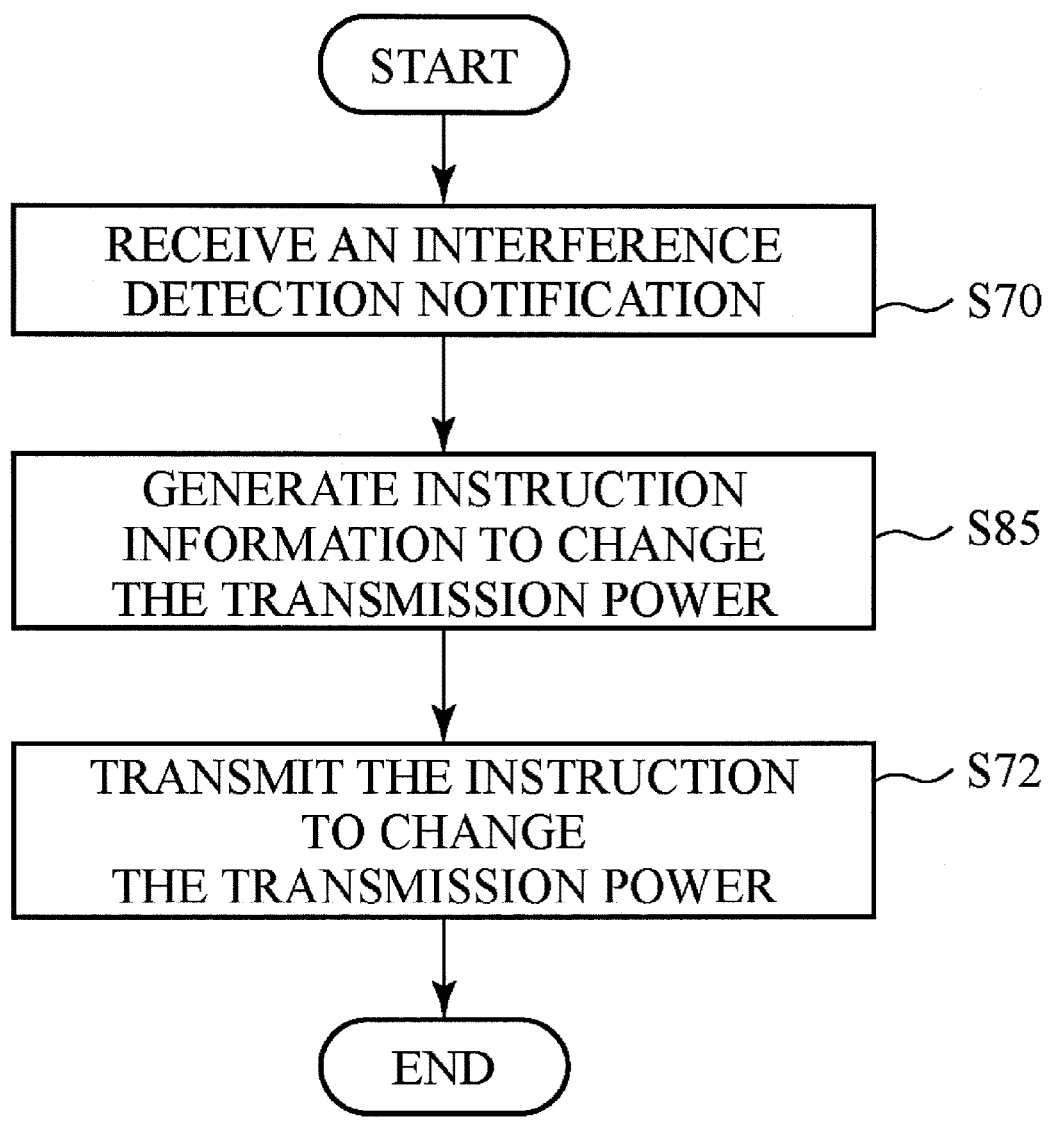
FIG. 15 is a flowchart illustrating an operation to be performed by the management device in accordance with the second embodiment.

FIG. 15 is a flowchart illustrating an operation to be performed by the management device 80. In step S80 of FIG. 13, the information receiving unit 84 of the management device 80 receives the information indicating that interference has been detected from the base station device 10*a* via the network 210 (step S70). Based on the information indicating that interference has been detected, which is the information as to the connection prohibition frequency, the instruction information generating unit 86 generates the instruction information to cause the base station device 10*a* to change the transmission power to be supplied to the wireless terminal 50 for wireless communications (step S85). Like the power changing unit 40 in step S50 of FIG. 7, the instruction information generating unit 86 can generate the instruction information so as to instruct a change in the transmission power. The instruction information generating unit 86 can also generate the instruction information, based on the information about the locations of macro base stations and femto base stations stored in the holding unit 112, and the information about the current transmission power. For example, the optimum transmission power of the femto base station 202 (or the base station device 10*a*) can be determined based on the distance between the macro base station 200 and the femto base station 202, the amount of the transmission power of the macro base station 200, and the amount of the transmission power of the femto base station 202. The instruction transmitting unit 88 transmits the instruction information to the base station device 10*a* via the network 210 (step S72), and the operation then comes to an end.

Figure 16:
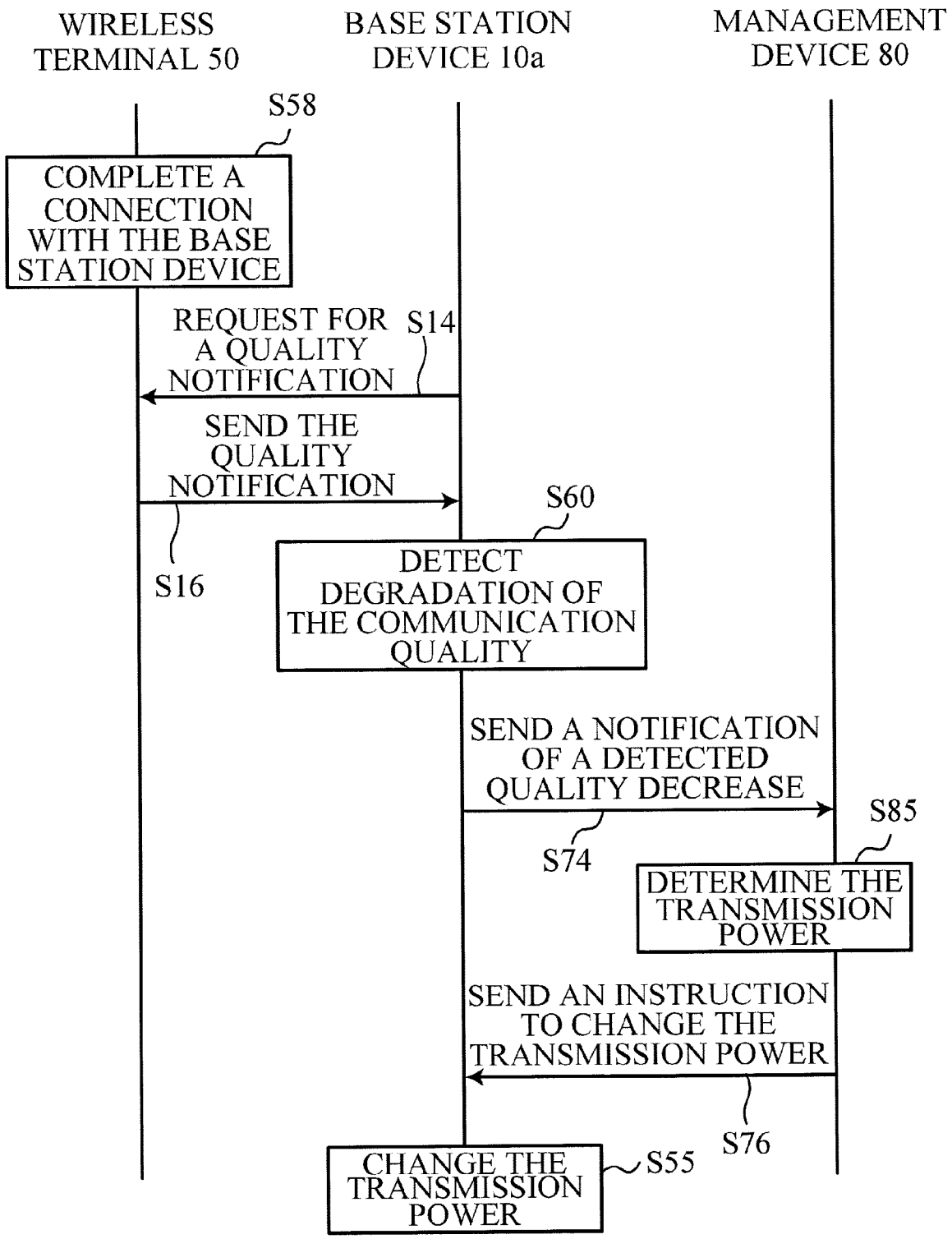
FIG. 16 is a sequence diagram of the wireless communication system in accordance with the second embodiment, continued from the sequence diagram of FIG. 13.

Next, the operation to be performed to change the transmission power based on the communication quality is described. FIG. 16 is a sequence diagram of the wireless communication system in accordance with the second embodiment. Here, the wireless terminal 50 is a terminal registered with the base station device 10*a*. As depicted in FIG. 16, the procedures of steps S58, S14, S16, and S60 are the same as the corresponding procedures of the first embodiment depicted in FIG. 8, and therefore, explanation of them is omitted here. When detecting degradation of the communication quality, the base station device 10*a* notifies the management device 80 of the degradation of the communication quality via the network 210 (step S74). Based on the notification of the detected degradation of the communication quality (the information about the quality of the wireless communication state), the management device 80 determines the transmission power (step S85). The management device 80 transmits the instruction information to the base station device 10*a* via the network 210 (step S76). Based on the instruction information, the base station device 10*a* changes the transmission power to be output to the wireless terminal 50 (step S55).

Figure 17:
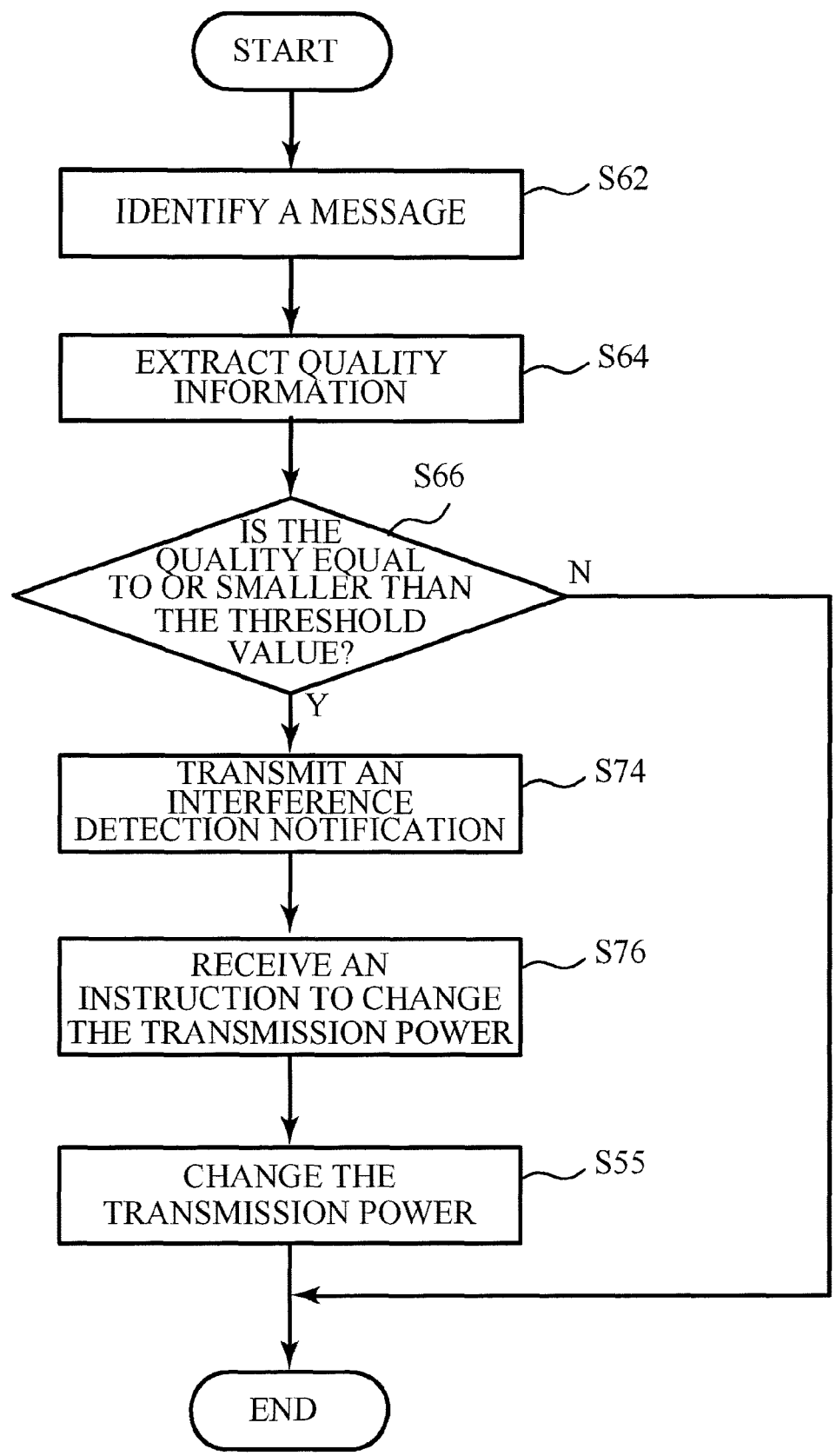
FIG. 17 is a flowchart illustrating the operation to be performed by the base station device in accordance with the second embodiment, continued from the flowchart of FIG. 14.

FIG. 17 is a flowchart illustrating an operation to be performed by the base station device 10*a*. As depicted in FIG. 17, the procedures of steps S62 through S66 are the same as the corresponding procedures of the first embodiment depicted in FIG. 9, and therefore, explanation of them is omitted here. After the quality detecting unit 42 detects degradation of the communication quality in step S66, the information transmitting unit 49 notifies the management device 80 of the degradation of the communication quality (step S74). The information receiving unit 84 of the management device 80 receives the information indicating that the degradation of the communication quality has been detected from the base station device 10*a*. Based on the information indicating that the degradation of the communication quality has been detected, the instruction information generating unit 86 of the management device 80 generates the information (the instruction information) about the instruction issued to cause the base station device 10*a* to change the transmission power to be supplied to the wireless terminal 50 for wireless communications (step S85 of FIG. 16). Like the power changing unit 40 in step S55 of FIG. 9, the instruction information generating unit 86 can generate the instruction information for changing the transmission power. The instruction information generating unit 86 can also generate the instruction information, based on the information about the locations of macro base stations and femto base stations stored in the holding unit 112, and the information about the current transmission power. The instruction transmitting unit 88 of the management device 80 transmits the instruction information to the base station device 10*a*. The instruction receiving unit 38 receives the instruction information from the management device 80 via the network N2 (step S76). Based on the instruction information, the power changing unit 40 changes the transmission power to be output to the wireless terminal 50 (step S55), and the operation then comes to an end.

In accordance with the second embodiment, as in step S70 of FIG. 14, the information transmitting unit 49 of the base station device 10*a* transmits the information about the connection prohibition frequency to the management device 80 via the network 210. As in step S85 of FIG. 15, the instruction information generating unit 86 of the wireless communication management device 80 generates the information about the instruction to change the transmission power, based on the information about the connection prohibition frequency. As in step S72 of FIG. 14, the instruction receiving unit 38 of the base station device 10a receives the information about the instruction from the management device 80 via the network 210. As in step S50, the power changing unit 40 changes the transmission power, based on the information about the instruction.

In this manner, the management device 80 can determine the transmission power, taking into account the information as to the structure of the wireless communication carrier network (the information about the other macro base stations and femto base stations, and the likes).

Also, as in step S74 of FIG. 16, the information transmitting unit 49 of the base station device 10a transmits the information about the quality of the communication state to the management device 80 via the network 210. As in step S85, the instruction information generating unit 86 of the management device 80 generates the information about the instruction to change the transmission power, based on the information about the quality. As in step S76, the instruction receiving unit 38 of the base station device 10a receives the information about the instruction from the management device 80 via the network 210. As in step S55, the power changing unit 40 changes the transmission power, based on the information about the instruction.

As described above, when the transmission power is changed based on the communication quality information, the management device 80 can determine the transmission power.

In step S70 of FIG. 13, the base station device 110a sends the management device 80 the information indicating that interference has been detected, instead of the information about the connection prohibition frequency. However, the base station device 10a may transmit the connection prohibition frequency. In such a case, the management device 80 may detect interference.

[Third Embodiment]

Figure 18:
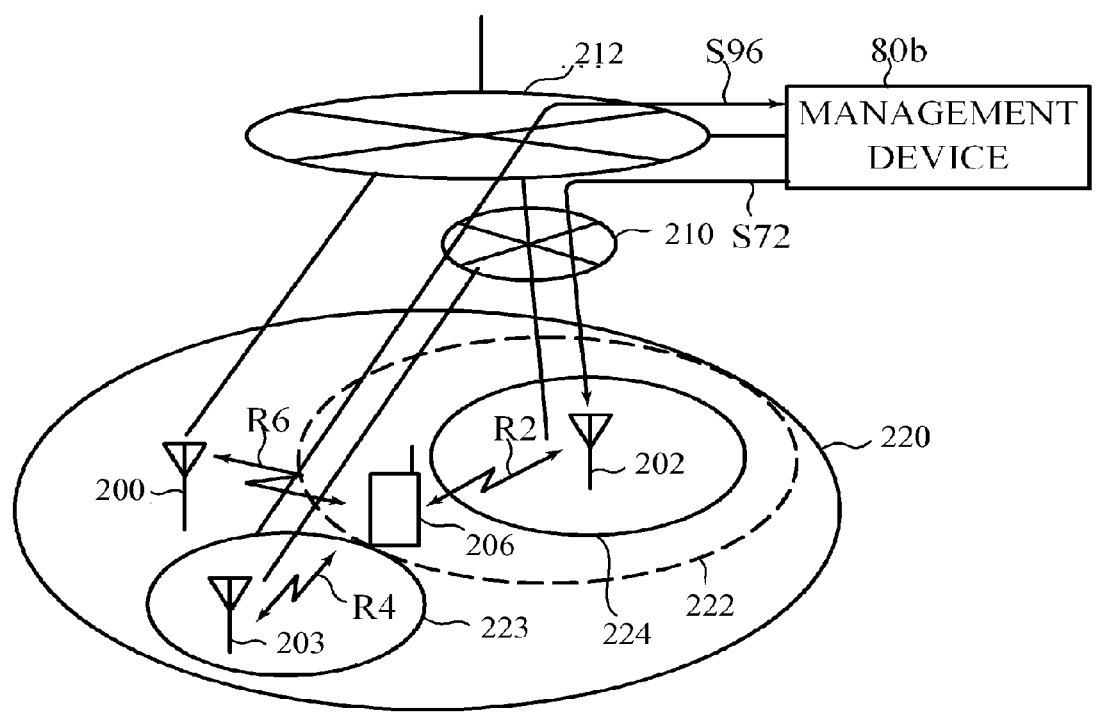
FIG. 18 illustrates the structure of a wireless communication system in accordance with a third embodiment of the present invention.

A third embodiment of the present invention concerns an example that involves two or more base station devices. FIG. 18 schematically illustrates a wireless communication system in accordance with the third embodiment. As depicted in FIG. 18, the wireless terminal 206 is not registered with a first femto base station 202, but is registered with a second femto base station 203. When the wireless terminal 206 requests a connection with the first femto base station 202 and the request is denied, the information about the denial is transmitted to the second femto base station 203 through radio transmission R4. The second femto base station 203 notifies a management device 80b via the network 210 that the first femto base station 202 has denied the connection request (step S96). When the frequency at which the first femto base station 202 denies a connection request becomes higher, the management device 80b determines a change of the transmission power of the first femto base station 202, and sends an instruction to the first femto base station 202 (step S72). In accordance with the instruction from the management device 80b, the first femto base station 202 changes the transmission power. Accordingly, the range of the femto cell 224 becomes smaller. Thus, the interference of the first femto base station 202 with the other wireless terminal 206 becomes smaller.

Figure 19:
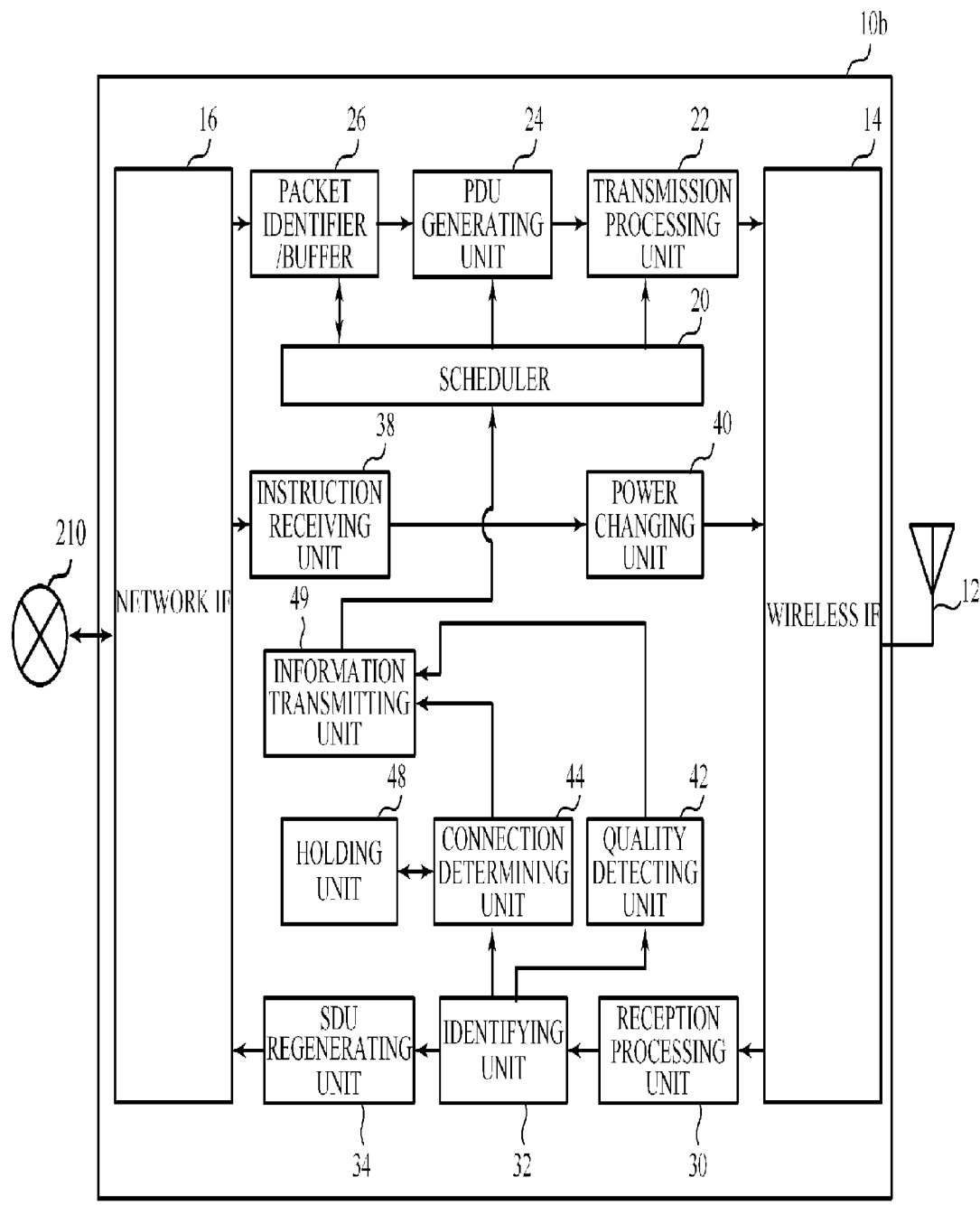
FIG. 19 is a functional block diagram of a first base station device in accordance with the third embodiment.

In the following, the third embodiment is described in greater detail. FIG. 19 is a functional block diagram of a first base station device 10b of the third embodiment. As depicted in FIG. 19, the information transmitting unit 49 outputs connection permission/prohibition information and the identification information to the scheduler 20. The other aspects of the structure of this embodiment are the same as those of the second embodiment depicted in FIG. 11, and therefore, explanation of them is omitted here.

Figure 20:
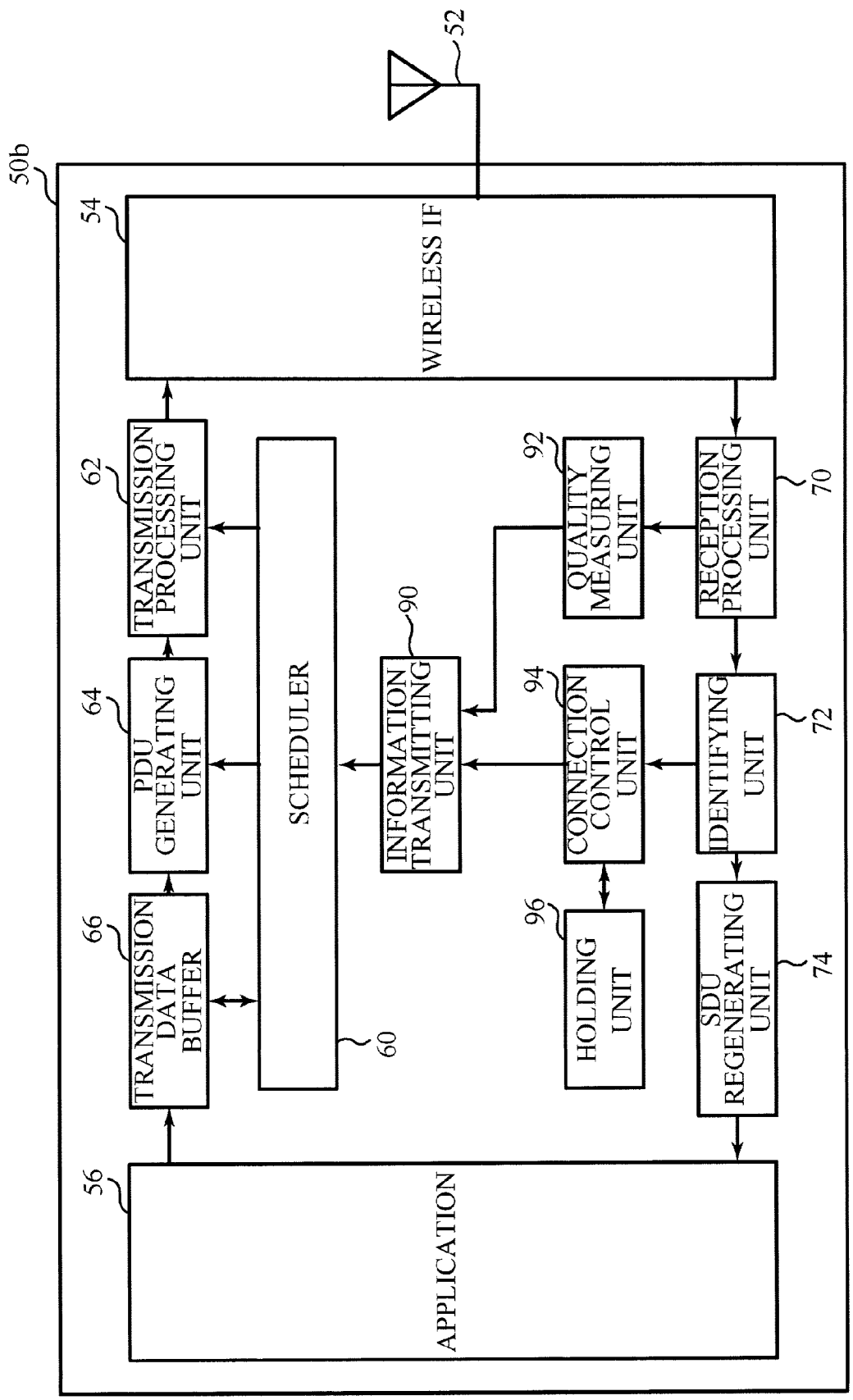
FIG. 20 is a functional block diagram of a wireless terminal in accordance with the third embodiment.

FIG. 20 is a functional block diagram of a wireless terminal 50b of the third embodiment. As depicted in FIG. 20, the quality measuring unit 92 measures the communication quality. When receiving a connection prohibition notification from the first base station device 10b, a connection control unit 94 stores the identification information for identifying the first base station device 10b into a holding unit 96. The information transmitting unit 90 sends a second base station device 10c the communication quality information obtained from the quality measuring unit 92 and the identification information obtained from the connection control unit 94 for identifying the first base station device 10b. The other aspects of the structure of this embodiment are the same as those of the first embodiment depicted in FIG. 5, and therefore, explanation of them is omitted here.

Figure 21:
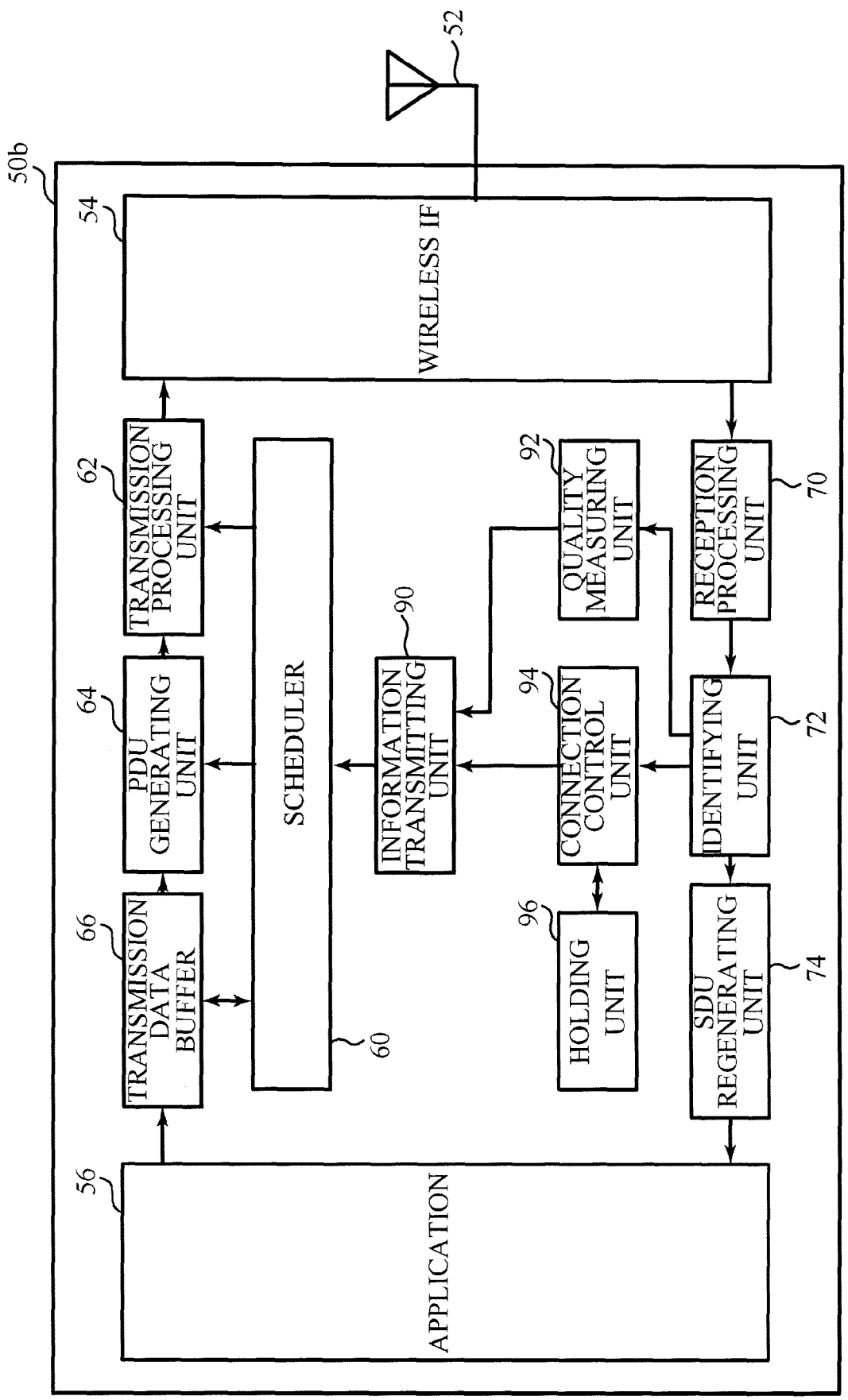
FIG. 21 is a functional block diagram of a second base station device in accordance with the third embodiment.

FIG. 21 is a functional block diagram of the second base station device 10c of the third embodiment. As depicted in FIG. 21, an information control unit 102 obtains the connection prohibition information and the identification information from the wireless terminal 50b, and stores the information into a holding unit 104. An information transmitting unit 100 transmits the connection prohibition information and the identification information to the management device 80b via the network 210. The other aspects of this structure are the same as those of the second embodiment depicted in FIG. 11, and therefore, explanation of them is omitted here.

Figure 22:
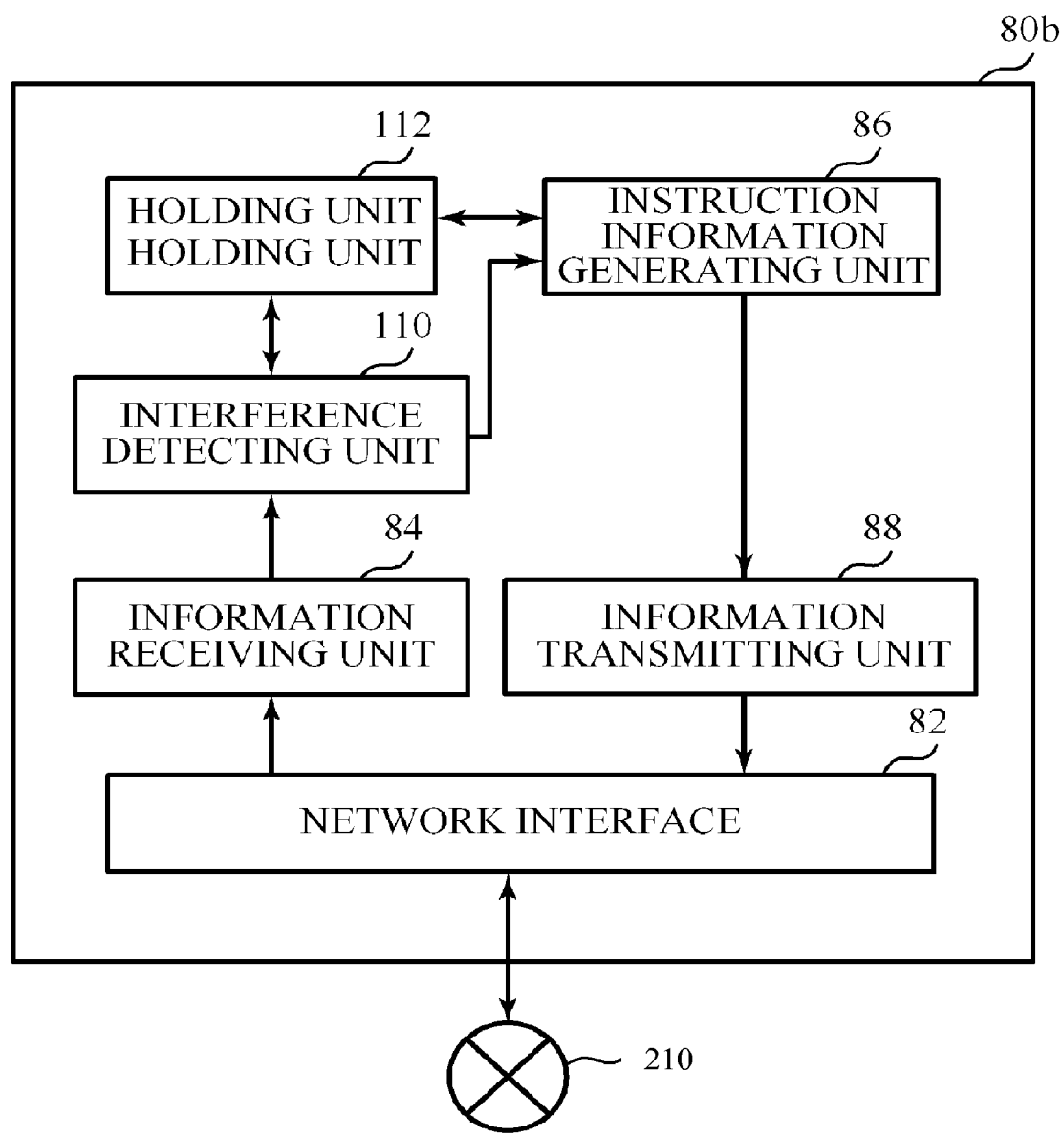
FIG. 22 is a functional block diagram of a management device in accordance with the third embodiment.

FIG. 22 is a functional block diagram of the management device 80b of the third embodiment. As depicted in FIG. 22, an interference detecting unit 110 detects the interference of the first base station device 10b with the wireless terminal 50b, based on the connection prohibition information and the identification information received by the information receiving unit 84 from the second base station device 80c. A holding unit 112 stores the connection prohibition information and the identification information associated with each other. The other aspects of this structure are the same as those of the second embodiment depicted in FIG. 12, and therefore, explanation of them is omitted here.

Figure 23:
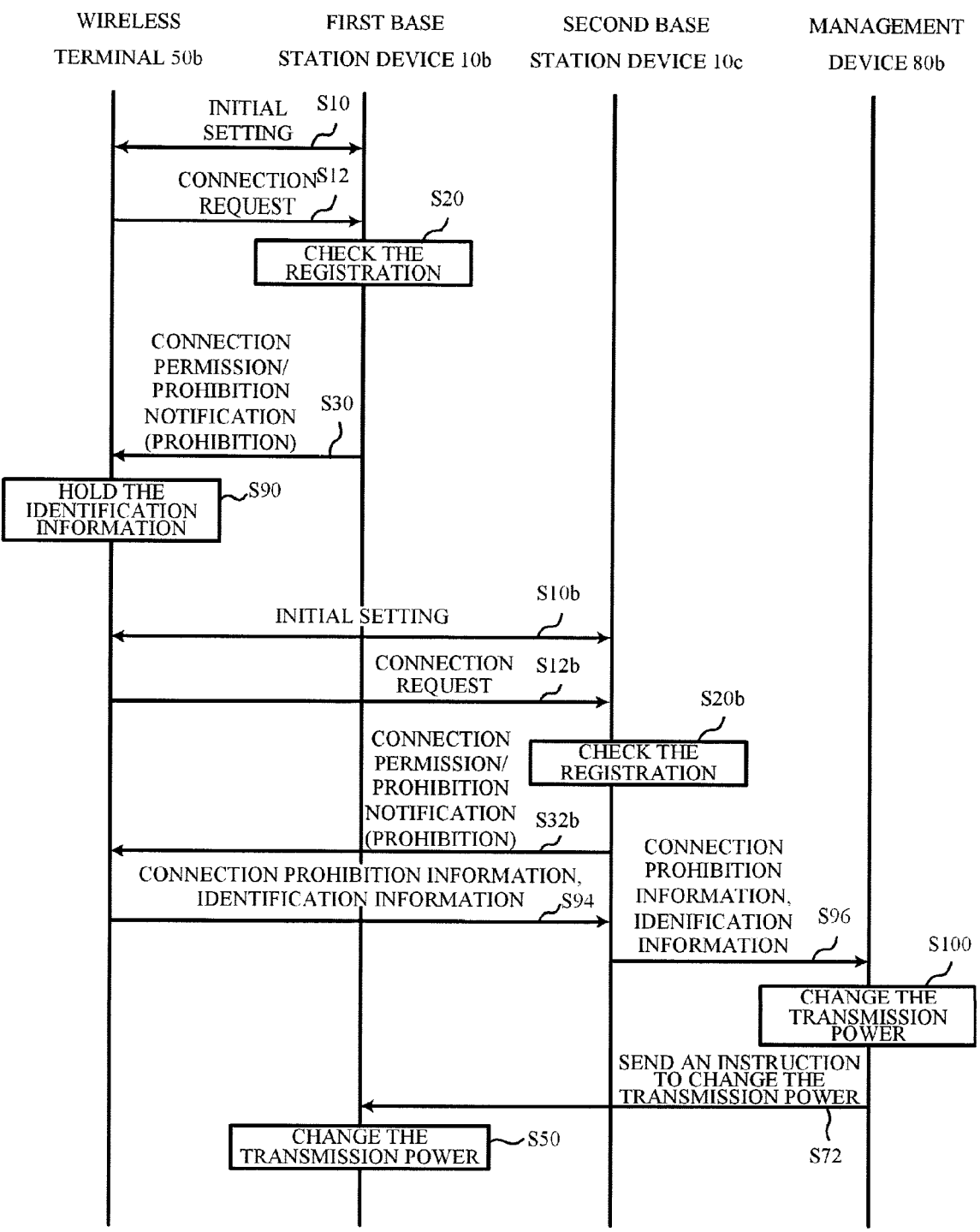
FIG. 23 is a sequence diagram of the wireless communication system in accordance with the third embodiment.

FIG. 23 is a sequence diagram of the wireless communication system in accordance with the third embodiment. Here, the wireless terminal 50b is a terminal not registered with the first base station device 10b. As depicted in FIG. 23, the procedures of steps S10 through S30 are the same as the corresponding procedures of the second embodiment depicted in FIG. 13. Upon receipt of a connection permission/ prohibition notification to deny a connection request, the wireless terminal 50b holds the identifier of the base station that has denied the connection request (step S90).

When the wireless terminal 50b enters the wireless communication area of the second base station device 10c, the wireless terminal 50b tries to connect with the second base station device 10c (steps S10b through S20b). Those procedures are the same as the procedures of steps S10 through S20, and therefore, explanation of them is omitted here. Since the wireless terminal 50b is registered with the second base station device 10c, the second base station device 10c sends the wireless terminal 50b a connection permission/prohibition notification indicating a connection permission (step S32b). The wireless terminal 50b then sends the second base station device 10c the connection prohibition information indicating that a connection with the first base station device 10b is prohibited, and the identification information for identifying base station devices having connections denied (step S94). The second base station device 10c notifies the management device 80b that the first base station device 10b has denied a connection request (step S96b). Based on the connection prohibition information, the management device 80b determines the transmission power of the first base station device 10b (step S100). The management device 80b sends the first base station device 10b the instruction information about the instruction to change the transmission power (step S72). In accordance with the instruction from the management device 80b, the first base station device 10b changes the transmission power (step S50).

Figure 24:
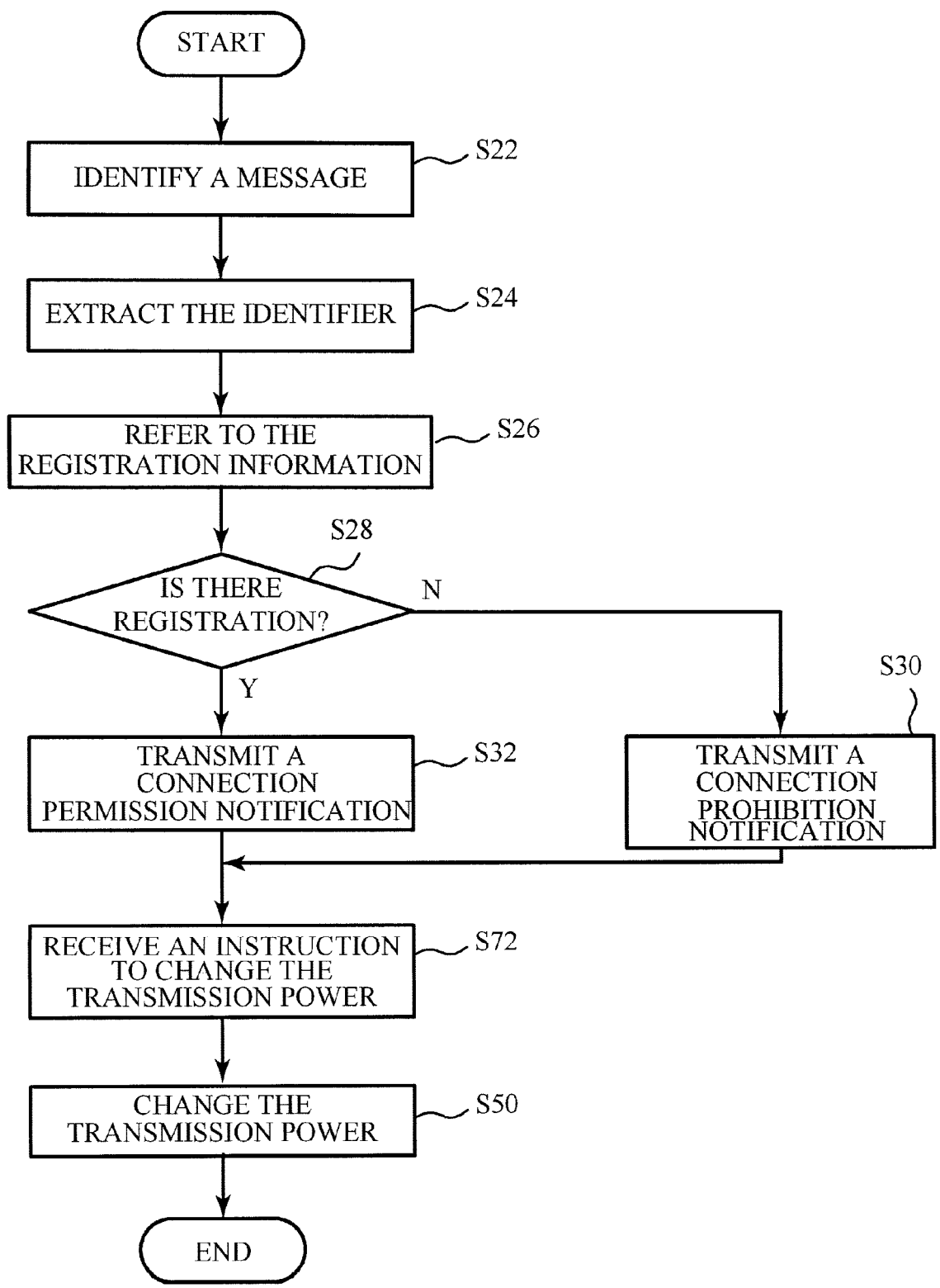
FIG. 24 is a flowchart illustrating an operation to be performed by the first base station device in accordance with the third embodiment.

FIG. 24 is a flowchart illustrating an operation to be performed by the first base station device 10b. As depicted in FIG. 24, the procedures of steps 22 through S32 are the same as the corresponding procedures of the second embodiment depicted in FIG. 14, and therefore, explanation of them is omitted here. In step S30, the information transmitting unit 49 notifies the wireless terminal 50b that a connection request from the wireless terminal 50b has been denied. After steps S30 and S32, the instruction receiving unit 38 receives the instruction information from the management device 80b (step S72). In accordance with the instruction information, the power changing unit 40 changes the transmission power (step S50).

Figure 25:
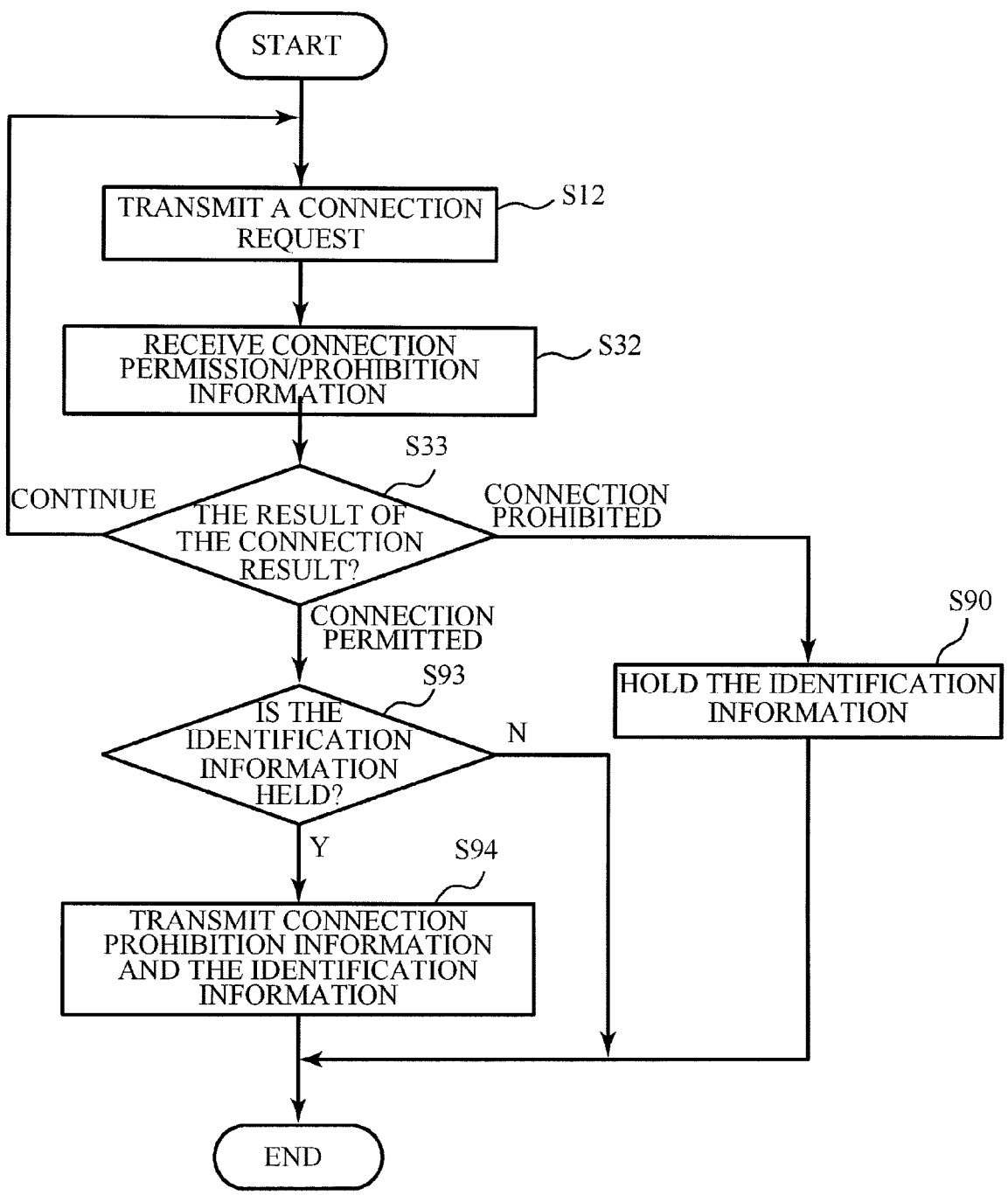
FIG. 25 is a flowchart illustrating an operation to be performed by the wireless terminal in accordance with the third embodiment.

FIG. 25 is a flowchart illustrating an operation to be performed by the wireless terminal 50b. As depicted in FIG. 25, the transmission processing unit 62 transmits a connection request to the first base station device 10b (step S12), as in step S10 of the first embodiment depicted in FIG. 6. The reception processing unit 70 receives a connection permission/prohibition notification from the first base station device 10b (step S32). The connection control unit 94 then determines whether a connection can be allowed (step S33). If a connection is to be continued, the operation returns to step S12. If the connection request is denied, or if a connection with the first base station device 10b is tried, the holding unit 96 holds the connection prohibition information and the identification information about base stations (step S90). If a connection is allowed, or a connection with the second base station device 10c is tried, the connection control unit 94 determines whether the holding unit 96 holds the identification information of a base station having a connection prohibited (step S93). In a case where the determination result is "No", the operation comes to an end. In a case where the determination result is "Yes", the information transmitting unit 90 transmits the connection prohibition information and the identification information to the second base station device 10c (step S94). The operation then comes to an end. In the case of WiMAX, for example, the identification information may be represented by the BSID of the first base station device 10b. In a case where a request for a connection with the first base station device 10b and reception of the connection prohibition information are repeated several times, the holding unit 96 may store the number of connection request denials as the connection prohibition information.

Figure 26:
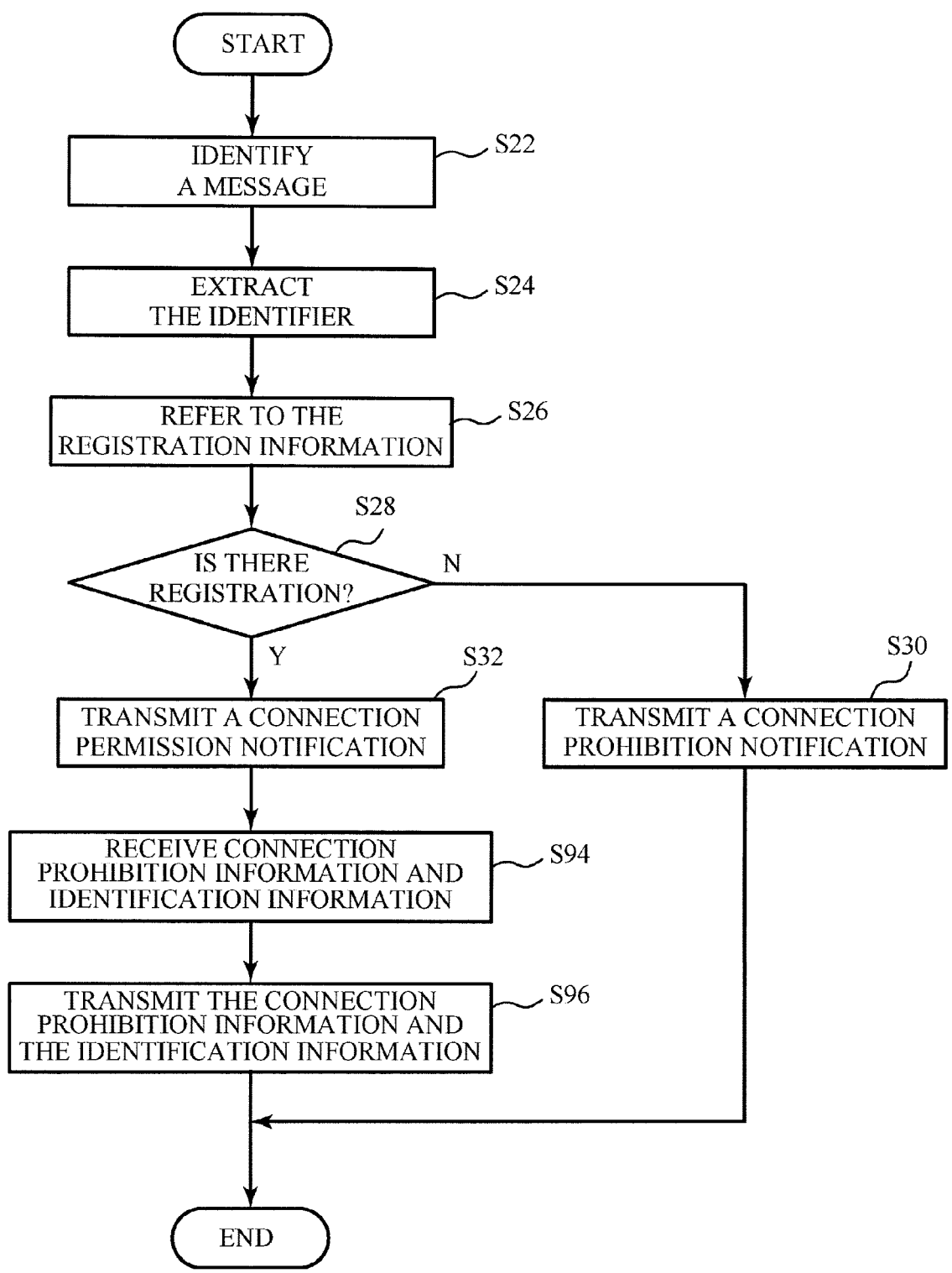
FIG. 26 is a flowchart illustrating an operation to be performed by the second base station device in accordance with the third embodiment.

FIG. 26 is a flowchart illustrating an operation to be performed by the second base station device 10c. The procedures of steps S22 through S32 are the same as the corresponding procedures of the second embodiment depicted in FIG. 14, and therefore, explanation of them is omitted here. In a case where the determination result in step S28 is "No", a connection prohibition notification is transmitted to the wireless terminal 50b (step S30). After that, the operation comes to an end. In a case where the determination result in step S28 is "Yes", a connection permission notification is transmitted to the wireless terminal 50b (step S32). After that, the information control unit 102 receives the connection prohibition information and the identification information from the wireless terminal 50b (step S94). The information transmitting unit 100 transmits the connection prohibition information and the identification information to the management device 80b via the network 210 (step S96).

Figure 27:
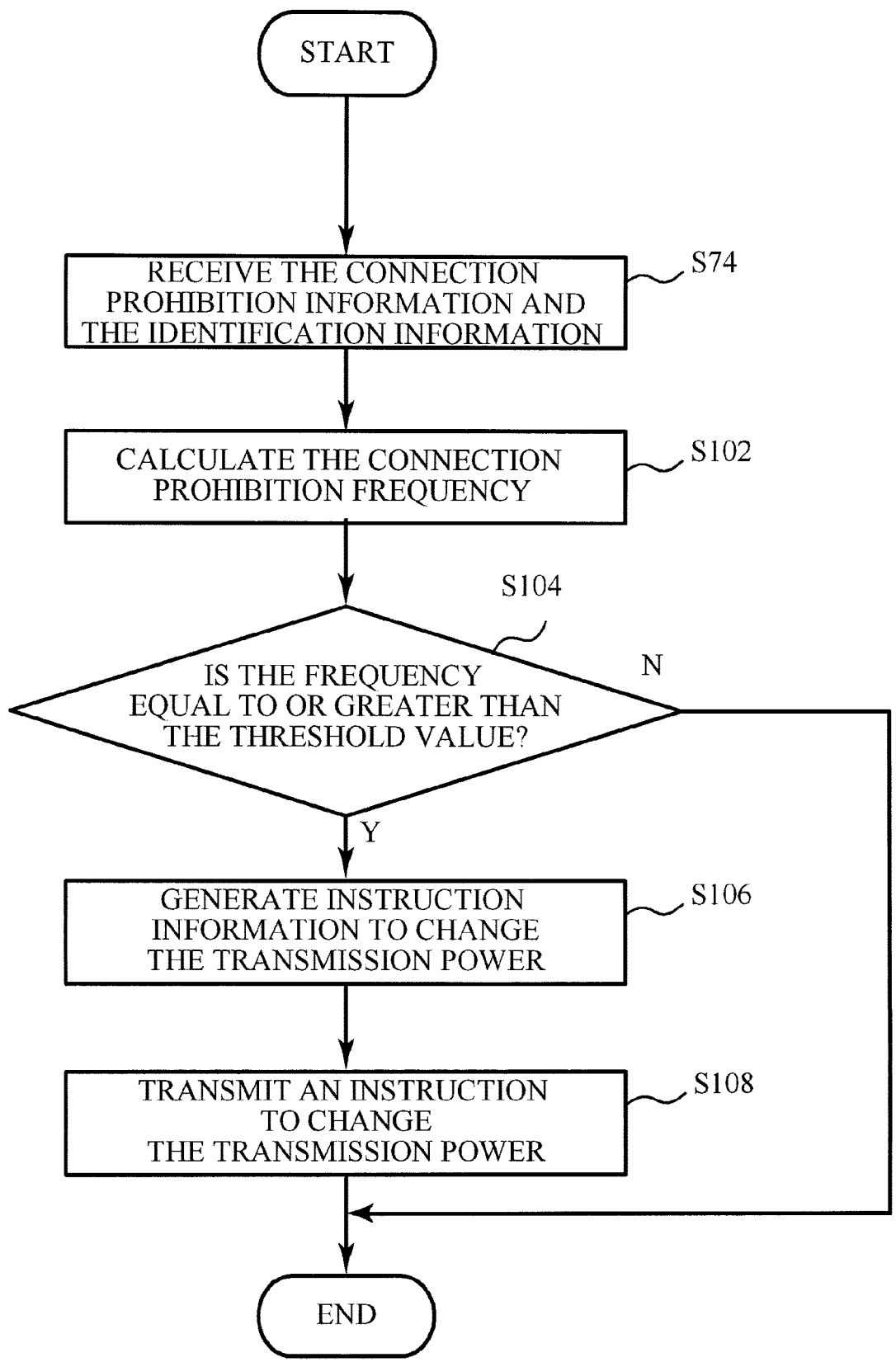
FIG. 27 is a flowchart illustrating an operation to be performed by a base station device in accordance with the third embodiment.

FIG. 27 is a flowchart illustrating an operation to be performed by the management device 80b. The information receiving unit 84 receives the connection prohibition information and the identification information from the second base station 10c via the network 210 (step S74). The interference detecting unit 110 calculates the frequency at which the first base station device 10b denies a connection request, based on the connection prohibition information and the identification information, and the past connection prohibition information and the past identification information held by the holding unit 112 (step S102). The holding unit 112 also holds the connection prohibition information related to the first base station device 10b received from a base station device other than the second base station device 10c. Accordingly, the interference detecting unit 110 can calculate the frequency at which the first base station device 10b denies a connection request, taking into account the connection prohibition information received from a base station device other than the second base station device 10c. The interference detecting unit 110 determines whether the connection prohibition frequency is equal to or greater than a predetermined threshold value (step S104). In a case where the determination result is "No", the operation comes to an end.

In a case where the determination result is "Yes", the instruction information generating unit 86 generates the instruction information about the instruction to change the transmission power (step S106). The instruction information generating unit 86 can determine the transmission power, based on the information about the locations of the first base station device 10b, the second base station device 10c, and the macro base station, and the information about the amount of transmission power, as in the second embodiment. For example, in a case where the first base station device 10b and the second base station device 10c are placed in the vicinity of each other, the wireless terminal 50b easily interferes with the first base station device 10b. Therefore, the transmission power of the first base station device 10b can be made smaller. In a case where interference is often caused between the first base station device 10b and the wireless terminal 50b even though the first base station device 10b and the second base station device 10c are placed at a distance from each other, the transmission power of the first base station device 10b might be too large. Therefore, the transmission power of the first base station device 10b can be made even smaller. In a case where the connection prohibition frequency of the first base station device 10b is high, and the connection prohibition information has been transmitted to a number of base station devices, the transmission power of the first base station device 10b might be very large. Therefore, the transmission power of the first base station device 10b can be made sufficiently smaller. The instruction transmitting unit 88 transmits the instruction information to the first base station device 10b via the network 210 (step S108).

In accordance with the third embodiment, as in step S30 of FIG. 24, the connection determining unit 44 of the first base station device 10b sends the wireless terminal 50b a connection prohibition notification in response to a connection request from the wireless terminal 50b and the identification information for identifying the device. As in steps S33 and S90 of FIG. 25, the holding unit 96 holds the identification information for identifying the first base station device 10b, if a connection request is denied. As in steps S93 and S94, the transmission processing unit 62 of the wireless terminal 50b transmits the connection prohibition information and the identification information to the second base station device 10c. As in step S96 of FIG. 26, the information transmitting unit 100 of the second base station device 10c transmits the connection prohibition information and the identification information to the management device 80b via the network 210. In steps S104 and S106 of FIG. 27, the instruction information generating unit 86 of the management device 80b calculates the frequency at which the first base station device 10b denies a connection request, based on the connection prohibition information and the identification information. Based on the frequency, the instruction information generating unit 86 generates the instruction information about the instruction to cause the first base station device 10b to change the transmission power to be supplied to the wireless terminal 50b for wireless communications. In step S50 of FIG. 24, the power changing unit 40 changes the transmission power, based on the information about the instruction.

In the third embodiment, the management device 80b gathers the connection prohibition information, and the management device 80b calculates the connection prohibition frequency and determines the transmission power. Accordingly, each femto base station does not need to calculate the connection prohibition frequency. The management device 80b can also set the threshold value for determining the connection prohibition frequency. Accordingly, the intension of the wireless carrier can be more effectively reflected in determining the transmission power.

The information transmitting unit 90 of the wireless terminal 50b may send the second base station device 10c the information about the communication quality that is measured by the quality measuring unit 92 and is transmitted from the first base station device 10b. The information transmitting unit 100 of the second base station device 10c may transmit the information about the communication quality to the management device 80b. As in the second embodiment, the instruction information generating unit 86 of the management device 80b may generate the instruction to change the transmission power, based on the information about the communication quality.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A base station device comprising:
a connection determining unit that allows a connection in the case that a wireless terminal is registered and that prohibits the connection in the case that the wireless terminal is not registered in response to a wireless communication connection request from the wireless terminal that can have wireless communications with other base stations;
a frequency calculating unit that calculates a frequency that is the number of times the connection determining unit prohibits the connection in a given period; and
a power changing unit that changes transmission power, based on the frequency.

2. The base station device as claimed in claim 1, further comprising
a quality detecting unit that detects quality of a wireless communication with the wireless terminal,
wherein the power changing unit changes the transmission power, based on the quality of the wireless communication.

3. A base station device comprising:
a connection determining unit that allows a connection in the case that a wireless terminal is registered and that prohibits the connection in the case that the wireless terminal is not registered in response to a wireless communication connection request from the wireless terminal that can have wireless communications with other base stations;
a frequency calculating unit that calculates a frequency that is the number of times the connection determining unit prohibits the connection in a given period;
an information transmitting unit that transmits information about the frequency to a wireless communication management device via a network;
an instruction receiving unit that receives information about an instruction generated by the wireless communication management device based on the information about the frequency via the network; and
a power changing unit that changes transmission power, based on the information about the instruction.

4. The base station device as claimed in claim 3, further comprising
a quality detecting unit that detects quality of a wireless communication with the wireless terminal,
wherein:
the information transmitting unit transmits the information about the quality of the wireless communication to the wireless communication management device via the network; and
the instruction receiving unit receives the information about the instruction generated by the wireless communication management device based on the information about the quality of the wireless communication via the network.

5. A wireless communication management device that is connected to a base station device via a network,
the wireless communication management device comprising:
an information receiving unit that receives information via the network, the information being about a frequency that is the number of times the base station device prohibits a connection in the case that a wireless terminal is not registered in the base station device in response to a wireless communication connection request from the wireless terminal that can have wireless communications with other base stations in a given period;
an instruction information generating unit that generates information about an instruction to change transmission power, based on the information about the frequency; and
an instruction transmitting unit that transmits the information about the instruction to the base station device via the network.

6. A wireless communication system comprising:
a base station device; and
a wireless communication management device that is connected to the base station device via a network,
wherein:
the base station device includes: a connection determining unit that allows a connection in the case that a wireless terminal is registered and that prohibits the connection in the case that the wireless terminal is not registered in response to a wireless communication connection request from the wireless terminal that can have wireless communications with other base stations; a frequency calculating unit that calculates a frequency that is the number of times the connection determining unit prohibits the connection in a given period; an information transmitting unit that transmits information about the frequency to the wireless communication management device via the network; an instruction receiving unit that receives information about an instruction from the wireless communication management device via the network; and a power changing unit that changes transmission power, based on the information about the instruction; and
the wireless communication management device includes an instruction information generating unit that generates the information about the instruction to change the transmission power for wireless communications of the base station device with the wireless terminal, based on the information about the frequency.

7. A base station device comprising:
a connection determining unit that allows a connection in the case that a wireless terminal is registered and prohibits the connection in the case that the wireless terminal is not registered in response to a wireless communication connection request from the wireless terminal that can have wireless communications with other base stations;
a notifying unit that notifies the wireless terminal that the connection is prohibited in response to the connection request;
an instruction receiving unit that receives information about an instruction from a management device via a network, the instruction being issued based on a frequency that is the number of times the connection is prohibited in response to the connection request in a given period; and
a power changing unit that changes transmission power, based on the information about the instruction.

8. A base station device comprising:
an information receiving unit that receives connection prohibition information and identification information for identifying another base station device, the connection prohibition information indicating the another base station device prohibits a connection in the case that a wireless terminal is not registered in the another base station in response to a wireless communication connection request from the wireless terminal that can have wireless communications with other base stations; and
an information transmitting unit that transmits the connection prohibition information and the identification information to a wireless communication management device via a network.

9. A wireless terminal comprising:
a connection requesting unit that sends a wireless communication connection requests to a first base station device;
a holding unit that holds identification information for identifying the first base station device, when a connection is prohibited by the first base station device in the case that the wireless terminal is not registered in the first base station device in response to the connection request; and
an information transmitting unit that transmits connection prohibition information and the identification information for identifying the first base station device to a second base station device, the connection prohibition information indicating that the first base station device prohibits the connection.

10. A wireless communication management device that is connected to a first base station device and a second base station device via a network,
the wireless communication management device comprising:
an information receiving unit that receives connection prohibition information and identification information for identifying the first base station device from the second base station device via the network, the connection prohibition information indicating that the first base station device prohibits a connection in the case that a wireless terminal is not registered in the first base station in response to a wireless communication connection request from the wireless terminal;
an instruction information generating unit that calculates a frequency that is the number of times the first base station device prohibits the connection in a given period based on the connection prohibition information and the identification information, and generates information about an instruction to change transmission power of the first base station device, based on the frequency; and
an instruction transmitting unit that transmits the information about the instruction to the first base station device.

11. A wireless communication system comprising:
a first base station device and a second base station device; and
a wireless communication management device that is connected to the second base station device via a network,
wherein:
the first base station device includes: a connection determining unit that allows a connection in the case that a wireless terminal is registered and that prohibits the connection in the case that the wireless terminal is not registered in response to a wireless communication connection request from the wireless terminal; a notifying unit that notifies the wireless terminal that the connection is prohibited in response to the connection request, and sends identification information for identifying the first base station device to the wireless terminal; an instruction receiving unit that receives information about an instruction from a management device via the network; and a power changing unit that changes transmission power, based on the information about the instruction;
the second base station device includes: an information receiving unit that receives connection prohibition information and the identification information for identifying the first base station device from the wireless terminal, the connection prohibition information indicating that the first base station device prohibits the connection in response to the connection request; and an information transmitting unit that transmits the connection prohibition information and the identification information to the wireless communication management device via the network: and the wireless communication management device includes an instruction information generating unit that calculates a frequency that is the number of times the first base station device prohibits the connection in a given period, based on the connection prohibition information and the identification information, and generates the information about the instruction to change the transmission power of the first base station device.

* * * * *